(12) United States Patent
Hitomi

(10) Patent No.: US 8,104,824 B2
(45) Date of Patent: Jan. 31, 2012

(54) VEHICLE DOOR SYSTEM

(75) Inventor: Yoshinori Hitomi, Okazaki (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 357 days.

(21) Appl. No.: 12/376,588

(22) PCT Filed: Jul. 24, 2007

(86) PCT No.: PCT/IB2007/002096
§ 371 (c)(1),
(2), (4) Date: Feb. 6, 2009

(87) PCT Pub. No.: WO2008/017912
PCT Pub. Date: Feb. 14, 2008

(65) Prior Publication Data
US 2010/0181797 A1 Jul. 22, 2010

(30) Foreign Application Priority Data
Aug. 9, 2006 (JP) .................................. 2006-217376

(51) Int. Cl.
*B60R 21/01* (2006.01)
*E05B 65/32* (2006.01)
*E05B 65/20* (2006.01)
*E05B 65/42* (2006.01)
*B62D 25/04* (2006.01)
*B60J 5/04* (2006.01)

(52) U.S. Cl. ............. 296/146.5; 292/341.16; 296/146.4; 296/187.03

(58) Field of Classification Search ...................... 49/379; 70/237; 292/341.15, 341.16, DIG. 22, DIG. 65; 296/146.1, 146.4, 146.9, 155, 187.03, 187.05, 296/187.09, 190.03, 146.5

See application file for complete search history.

(56) References Cited

U.S. PATENT DOCUMENTS
4,544,198 A * 10/1985 Ochiai et al. .................. 296/155
(Continued)

FOREIGN PATENT DOCUMENTS
DE 2 053 151 3/1972
(Continued)

OTHER PUBLICATIONS
"Notification of Reason for Refusal" dated Jul. 4, 2008, in Japanese Patent Application No. 2006-217376, filed Aug. 9, 2006.

*Primary Examiner* — Glenn Dayoan
*Assistant Examiner* — Paul Chenevert
(74) *Attorney, Agent, or Firm* — Finnegan, Henderson, Farabow, Garrett & Dunner, LLP

(57) ABSTRACT

According to a vehicle door system (10), when a forward collision prediction sensor (76) predicts a forward collision of a vehicle (12), a state is immediately brought about where a terminal edge portion (54) at the rear end of a front door (16) is positioned more outwardly in the vehicle width direction than a terminal edge portion (56) at the front end of a rear door (18). Thus, even when the front door (16) is moved toward the rear door (18) side (that is, toward the rear of the vehicle) due to a forward collision or the like that has occurred after the forward collision is predicted, for example, it is possible to prevent the situation in which the front door (16) is jammed inside the rear door (18), more specifically, the situation in which a rear-end hemmed portion (60) of the front door (16) gets inside a front-end hemmed portion (62) of the rear door (18) with respect to the vehicle width direction.

12 Claims, 25 Drawing Sheets

U.S. PATENT DOCUMENTS

| | | | | |
|---|---|---|---|---|
| 4,707,007 | A * | 11/1987 | Inoh | 292/341.16 |
| 4,842,313 | A * | 6/1989 | Boyko et al. | 292/341.16 |
| 4,982,984 | A * | 1/1991 | Yokota et al. | 292/201 |
| 5,066,056 | A * | 11/1991 | Schap | 292/341.16 |
| 5,586,646 | A * | 12/1996 | Bridgeman et al. | 200/541 |
| 5,902,004 | A * | 5/1999 | Waltz et al. | 296/146.9 |
| 6,196,619 | B1 | 3/2001 | Townsend et al. | |
| 6,609,748 | B1 * | 8/2003 | Azzouz et al. | 296/146.1 |
| 6,969,108 | B2 * | 11/2005 | Fukumoto et al. | 296/155 |
| 7,354,097 | B2 * | 4/2008 | Jackson et al. | 296/146.1 |
| 7,997,638 | B2 * | 8/2011 | Inami et al. | 296/146.9 |
| 2005/0154512 | A1 * | 7/2005 | Schubert et al. | 701/38 |
| 2005/0218663 | A1 * | 10/2005 | Schupp et al. | 292/216 |
| 2005/0218670 | A1 * | 10/2005 | Brose et al. | 292/341.16 |
| 2006/0175846 | A1 * | 8/2006 | Rice et al. | 292/341.16 |
| 2006/0197359 | A1 * | 9/2006 | Yamasaki | 296/187.09 |
| 2008/0269990 | A1 * | 10/2008 | Ghannam et al. | 701/45 |

FOREIGN PATENT DOCUMENTS

| | | |
|---|---|---|
| DE | 30 24 230 A1 | 1/1982 |
| DE | 296 13 472 U1 | 11/1996 |
| EP | 0 204 996 A3 | 12/1986 |
| JP | 62039317 A * | 2/1987 |
| JP | 10-152069 | 6/1998 |
| JP | 2001-341528 | 12/2001 |
| JP | 2005-271686 | 10/2005 |

* cited by examiner

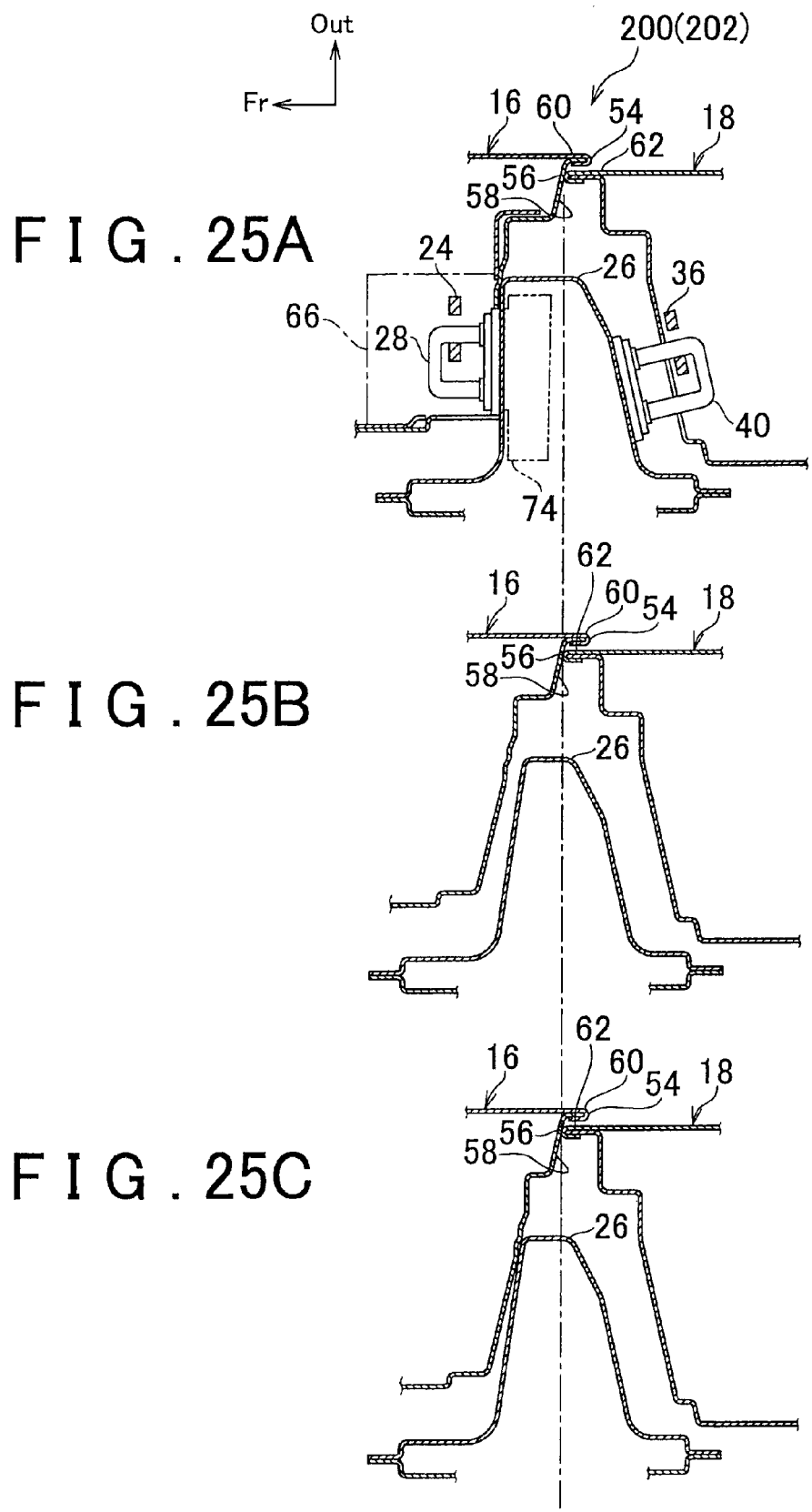

VEHICLE DOOR SYSTEM

CROSS-REFERENCE TO RELATED APPLICATIONS

This application is a national phase application of International Application No. PCT/IB2007/002096, filed Jul. 24, 2007, and claims the priority of Japanese Application No. 2006-217376, filed Aug. 9, 2006, the contents of both of which are incorporated herein by reference.

BACKGROUND OF THE INVENTION

1. Field of the Invention

The present invention relates to a vehicle door system, more specifically, to a vehicle door system including a mechanism for preventing one of a pair of doors, which are arranged on a side portion of a vehicle body along the longitudinal direction of a vehicle, from being jammed inside the other door due to the force generated due to a forward collision or the like.

2. Description of the Related Art

With regard to this type of vehicle door system, the following is available (see Japanese Patent Application Publication No. H10-152069 (JP-A-H10-152069), for example). Shown in the vehicle door system is an example of a door-openability securing system that secures the openability of vehicle doors after a collision. In this example, a seesaw member is disposed between a rear end portion of a front door and a center pillar. When a force is applied to the front door at the time of a forward collision, and the front door in turn pushes a front arm portion of the seesaw member, the seesaw member rotates and a rear end portion of the front door is pushed and displaced outwardly in the vehicle width direction by a side arm portion of the seesaw member, whereby the jamming of the front door inside a rear door is prevented.

However, with regard to the example described in JP-A-H10-152069 cited above, it is necessary for the rear end portion of the front door to be pushed and displaced outwardly in the vehicle width direction in order to prevent the jamming of the front door inside the rear door at the time of a forward collision or the like. For this purpose, there are various restrictions as described below, for example.

Specifically, it is necessary for the seesaw member to be rotated in order to push and displace the rear end portion of the front door outwardly in the vehicle width direction, and for this purpose, it is necessary for the front door to be moved toward the rear of the vehicle and push the front arm portion of the seesaw member following a forward collision or the like.

In addition, in order to allow the front door to move toward the rear of the vehicle at the time of a forward collision or the like as mentioned above, it is necessary to reserve a wide space between a terminal edge portion of the front door and a terminal edge portion of the rear door so that the terminal edge portion of the front door and the terminal edge portion of the rear door do not interfere with each other.

Moreover, in order for the rear end portion of the front door to be pushed and displaced outwardly in the vehicle width direction, it is necessary that the pushing force applied by the seesaw member to the front door is greater than the holding force applied by the door lock that makes the front door and the vehicle body fixed to each other.

SUMMARY OF THE INVENTION

An object of the present invention is to provide a vehicle door system that can prevent the situation in which one door is jammed inside the other door at the time of a forward collision or the like, without causing various restrictions.

A vehicle door system according to a first aspect of the present invention includes: a pair of first and second doors that are arranged along the longitudinal direction of a vehicle on a side portion of a vehicle body, and that have first and second terminal edge portions, respectively, extending in the vertical direction of the vehicle, wherein states of the pair of the first and second doors include a first state where the pair of the first and second terminal edge portions face each other in the longitudinal direction of the vehicle, and a second state where the first terminal edge portion out of the pair of the first and second terminal edge portions is positioned more outwardly in the vehicle width direction than the second terminal edge portion; a drive means that changes the state of the pair of the first and second doors from the first state to the second state; a collision detection means that outputs a collision signal in response to at least one of prediction and detection of a collision of the vehicle; and a control means that controls the drive means so that the state of the pair of the first and second doors is changed from the first state to the second state in response to detection of the collision signal.

The terminal edge portion herein means an edge portion of the outside portion of the door.

In the vehicle door system, the pair of the doors are arranged on the vehicle body side portion along the longitudinal direction of the vehicle, and the state of the pair of the doors is set to the first state where the pair of the terminal edge portions extending in the vertical direction of the vehicle, with which the pair of the doors are provided on respective sides, face each other in the longitudinal direction of the vehicle during normal conditions where a forward collision or the like of the vehicle is not occurring, for example.

On the other hand, when the collision detection means predicts or detects a collision of the vehicle, a collision signal is output from the collision detection means in response to at least one of prediction and detection of a collision of the vehicle. When the control means detects the collision signal, the control means controls the drive means. In this way, the state of the pair of the doors is changed from the above-described first state to the second state by the drive means, so that the terminal edge portion of the first door is positioned more outwardly in the vehicle width direction than the terminal edge portion of the second door.

In order to position the terminal edge portion of the first door more outwardly in the vehicle width direction than the terminal edge portion of the second door, the first door out of the pair of the doors may be moved outwardly in the vehicle width direction, or the second door out of the pair of the doors may be moved inwardly in the vehicle width direction. Further, the first door out of the pair of the doors may be moved outwardly in the vehicle width direction, and at the same time, the second door out of the pair of the doors may be moved inwardly in the vehicle width direction. Specifically, it suffices that at least one of the pair of the doors is relatively moved.

Thus, according to the above-described vehicle door system, when a collision of the vehicle is predicted or detected, the terminal edge portion of the first door is positioned more outwardly in the vehicle width direction than the terminal edge portion of the second door. Accordingly, even when the first door is moved toward the second door because of a forward collision or the like, for example, it is possible to prevent the first door from being jammed inside the second door.

In addition, as described above, it is possible to position the terminal edge portion of the first door more outwardly in the vehicle width direction than the terminal edge portion of the second door, regardless of whether the first door is moved toward the second door side because of a forward collision or the like. Thus, it is unnecessary to add any members (such as seesaw members and cams) between one of the pair of the doors and the vehicle body side portion, for example, and the flexibility of the configuration between the doors and the vehicle body side portion is enhanced.

In addition, it is unnecessary to reserve a wide space between the terminal edge portion of the first door and the terminal edge portion of the second door, which makes it possible to dispose the terminal edge portion of the first door and the terminal edge portion of the second door close to each other. Accordingly, it is also possible to obtain good appearance of the pair of the doors by narrowing the space between the terminal edge portion of the first door and the terminal edge portion of the second door.

In the above vehicle door system, the second door in which the second terminal edge portion is provided may be configured as a slide door in which a link arm, one end of which is freely pivotally connected to the vehicle body side portion, is freely pivotally connected to the slide door on the other end side, and that slides with the link arm swinging.

The trajectory of the sliding movement of the terminal edge portion of this kind of link-arm type slide door lies along the vehicle width direction near the position at which the door is completely closed.

Accordingly, when, out of the pair of the doors, at least the second door in which the second terminal edge portion out of the pair of the terminal edge portions is provided is configured as a link-arm type slide door, it is possible to retract the portion of the second door on the terminal edge portion side inwardly in the vehicle width direction owing to the door trajectory characteristic of the link-arm type slide door. When the pair of the doors are each configured as a link-arm type slide door, it is possible to push and displace the portion of the first door on the terminal edge portion side outwardly in the vehicle width direction, and at the same time, retract the portion of the second door on the terminal edge portion side inwardly in the vehicle width direction.

When a forward collision or the like of the vehicle occurs, by retracting the portion of the second door on the terminal edge portion side inwardly in the vehicle width direction, or by pushing and displacing the portion of the first door on the terminal edge portion side outwardly in the vehicle width direction and retracting the portion of the second door on the terminal edge portion side inwardly in the vehicle width direction, for example, as described above, it is possible to position the terminal edge portion of the first door more outwardly in the vehicle width direction than the terminal edge portion of the second door.

The drive means may include: a holding portion that is capable of moving at least one door out of the pair of the first and second doors in the vehicle width direction while holding the one door at a portion thereof on the terminal edge portion side on the vehicle body side portion; and a drive portion for moving the holding portion in the vehicle width direction.

When the control means detects a collision signal, and the control means controls the drive portion in the drive means, the drive portion moves the holding portion in the vehicle width direction.

Specifically, when the first door out of the pair of the doors is held on the vehicle body side portion at the portion of the first door on the terminal edge portion side by the holding portion, for example, the drive portion moves the holding portion outwardly in the vehicle width direction. When the pair of the doors are individually held on the vehicle body side portion by separate holding portions at the portions of the doors on the terminal edge portion sides, the drive portions move the holding portion for the first door outwardly in the vehicle width direction, and the holding portion for the second door inwardly in the vehicle width direction. In this way, the state of the pair of the doors is changed from the first state to the second state described above, so that the terminal edge portion of the first door is positioned more outwardly in the vehicle width direction than the terminal edge portion of the second door.

It is unnecessary to make the direction in which the holding portion moves along the vehicle width direction coincide with the direction in which the portion of the door on the terminal edge portion side moves. For example, the portion of the door on the terminal edge portion side may be moved inwardly in the vehicle width direction using a reaction force generated due to the outward movement of the holding portion in the vehicle width direction.

The holding portion may be configured so as to be able to move in the vehicle width direction while holding the door on the vehicle body side portion. Accordingly, even when the holding portion for holding one door on the vehicle body side portion is moved outwardly in the vehicle width direction as described above, it is possible to maintain the state where the portion of the one door on the terminal edge portion side is held on the vehicle body side portion, by using the holding portion.

It should be noted that, when one door out of the pair of the doors is held on the vehicle body side portion at the portion of the one door on the terminal edge portion side by the holding portion, the portion of the one door on the terminal edge portion side may be pushed and displaced outwardly in the vehicle width direction by the holding portion due to the outward movement of the holding portion in the vehicle width direction. Alternatively, outward movement of the holding portion in the vehicle width direction may bring about a state where the portion of the one door on the terminal edge portion side can move outwardly in the vehicle width direction, so that, when an urging force exerted from a weather strip or the like is applied to the portion of the one door on the terminal edge portion side, for example, the portion of the one door on the terminal edge portion side is pushed and displaced outwardly in the vehicle width direction.

The first door out of the pair of the first and second doors may be held on the vehicle body side portion by the holding portion, and an urging means disposed between the first door and the vehicle body side portion may urge the portion of the first door on the terminal edge portion side outwardly in the vehicle width direction.

When a collision of the vehicle is predicted or detected, and the holding portion is therefore moved outwardly in the vehicle width direction, the urging force exerted by the urging means urges the portion of the door on the terminal edge portion side outwardly in the vehicle width direction along the terminal edge portion extending in the vertical direction of the vehicle. Accordingly, vertically one-sided application of the urging force to the portion of the first door on the terminal edge portion side is restricted, so that it is possible to suppress the occurrence of unevenness in the amount of outward movement in the vehicle width direction between upper and lower portions of the first door. Thus, it is possible to prevent the situation in which a part of the first door is partially jammed inside the second door.

Each of the pair of the first and second doors may include a means for fixedly holding the corresponding door on the vehicle body side portion on the terminal edge portion side in a middle portion in the vertical direction of the vehicle, wherein the first door may have a vehicle width direction surface that is formed along the first terminal edge portion more inwardly in the vehicle width direction than the first terminal edge portion, and that extends in the vehicle width direction, and the vehicle width direction surface may be formed so that the more distant a position on the vehicle width direction surface is from the door fixedly-holding means in the vertical direction of the vehicle, the longer a distance along the longitudinal direction of the vehicle between the vehicle width direction surface and the second terminal edge portion out of the pair of the first and second terminal edge portions becomes.

According to this construction, when a forward collision or the like of the vehicle is predicted, for example, the terminal edge portion of the first door is positioned more outwardly in the vehicle width direction than the terminal edge portion of the second door, so that the vehicle width direction surface formed in the first door more inwardly in the vehicle width direction than the terminal edge portion faces the terminal edge portion of the second door in the longitudinal direction of the vehicle.

When a forward collision of the vehicle occurs, for example, the force generated by the forward collision is applied to the first door. As a result, the vehicle width direction surface of the first door is brought into contact with (strikes) the terminal edge portion of the second door.

When a forward collision of the vehicle occurs, the force due to the collision (impact energy) is mainly transmitted to three portions: a roof portion; a rocker portion (lower edge portion of door opening); and a beltline portion. Meanwhile, the pair of the doors are held on the vehicle body side portions by the door fixedly-holding means on the terminal edge portion sides in the middle portion in the vertical direction of the vehicle. Thus, when the first door out of the pair of the doors is disposed on the vehicle front side, the amount of displacement toward the rear of the vehicle is larger at upper and lower portions as compared to that of the portion held by the door fixedly-holding means on the vehicle body side portion.

However, as described above, the vehicle width direction surface formed in the first door is formed so that the more distant the position on the vehicle width direction surface is from the door fixedly-holding means in the vertical direction of the vehicle, the longer the distance along the longitudinal direction of the vehicle between the vehicle width direction surface and the second terminal edge portion becomes.

In this case, even when, in the first door, the amount of displacement toward the rear of the vehicle becomes larger at upper and lower portions as compared to that of the portion held by the door fixedly-holding means on the vehicle body side portion, it is possible to make the time, at which the vehicle width direction surface of the front door is brought into contact with the terminal edge portion of the rear door, substantially the same over the vertical extension. Thus, it is possible to suppress concentration of the force exerted by the terminal edge portion of the second door on the vehicle width direction surface of the first door, and it is possible to prevent the first door from being jammed inside the second door.

The vehicle width direction surface may be formed inclined so that, from the inner side, the more outward a position on the vehicle width direction surface is in the vehicle width direction, the closer the vehicle width direction surface becomes to the second terminal edge portion out of the pair of the first and second terminal edge portions.

In this case, when the vehicle width direction surface of the first door is brought into contact with the terminal edge portion of the second door following a forward collision, for example, a component force is applied to the portion of the first door on the terminal edge portion side outwardly in the vehicle width direction because the vehicle width direction surface slides on the terminal edge portion of the second door. Thus, the portion of the first door on the terminal edge portion side is further pushed and displaced outwardly in the vehicle width direction, so that it is possible to prevent the first door from being jammed inside the second door.

The collision detection means may output a collision prediction signal in response to the prediction of a collision of the vehicle, and outputs a collision detection signal in response to the detection of a collision of the vehicle, and the control means may control the drive means so that the state of the pair of the first and second doors is changed from the first state to the second state in response to detection of the collision prediction signal, and so that, when a predetermined time has passed since the collision prediction signal is detected, and no collision detection signal is detected, the state of the pair of the first and second doors is changed from the second state to the first state.

According to this configuration, when the collision detection means predicts a collision of the vehicle, the collision detection means outputs a collision prediction signal in response to the prediction of the collision of the vehicle. When the control means detects the collision prediction signal, the control means controls the drive means. As a result, the state of the pair of the doors is changed from the first state to the second state by the drive means, so that the terminal edge portion of the first door is positioned more outwardly in the vehicle width direction than the terminal edge portion of the second door.

When the collision detection means detects a collision of the vehicle after the collision of the vehicle was predicted, the collision detection means outputs the collision detection signal. However, when the collision of the vehicle is avoided, for example, and therefore, no collision of the vehicle is detected after a collision of the vehicle was predicted, the collision detection means outputs no collision detection signal.

In this case, even when the state of the pair of the doors is changed from the first state to the second state, the control means detects no collision detection signal even after a predetermined time has passed since the collision prediction signal is detected. In this case, the drive means performs control so that the state of the pair of the doors is changed from the second state to the first state described above. Thus, the state of the pair of the doors is restored to the state where the pair of the terminal edge portions provided on respective sides face each other in the longitudinal direction of the vehicle.

Even in a case where the prediction of the collision of the vehicle has caused the state of the pair of the doors to be changed from the first state to the second state, when the collision of the vehicle is not detected even after the predetermined time has passed since the collision of the vehicle is predicted, the state of the pair of the doors is restored from the second state to the first state described above. In this way, it is possible to prevent the situation in which, despite the fact that no forward collision or the like of the vehicle is occurring, the terminal edge portion of the first door is left positioned more outwardly in the vehicle width direction than the terminal edge portion of the second door.

A second aspect of the present invention relates to a vehicle door system including: a pair of first and second doors that are arranged along a longitudinal direction of a vehicle on a side portion of a vehicle body, and that have first and second terminal edge portions, respectively, extending in a vertical direction of the vehicle, wherein the pair of the first and second terminal edge portions face each other in the longitudinal direction of the vehicle; and a means for fixedly holding the pair of the first and second doors on the vehicle body side portion on the terminal edge portion sides in a middle portion in the vertical direction of the vehicle. In this door system, the first door out of the pair of the first and second doors has a vehicle width direction surface that is formed along the first terminal edge portion more inwardly in the vehicle width direction than the first terminal edge portion, and that extends in the vehicle width direction. The vehicle width direction surface is formed so that the more distant a position on the vehicle width direction surface is from the door fixedly-holding means in the vertical direction of the vehicle, the longer a distance along the longitudinal direction of the vehicle between the vehicle width direction surface and the second terminal edge portion becomes.

When, for example, a forward collision or the like of the vehicle occurs, and the terminal edge portion of the first door is positioned more outwardly in the vehicle width direction than the terminal edge portion of the second door, the vehicle width direction surface formed in the first door more inwardly in the vehicle width direction than the first terminal edge portion is positioned so as to face the second terminal edge portion of the second door in the longitudinal direction of the vehicle. At this time, when the force generated by the forward collision is applied to the first door, the vehicle width direction surface of the first door is brought into contact with (strikes) the terminal edge portion of the second door.

The force due to the collision (impact energy) is mainly transmitted to three portions: a roof portion; a rocker portion (lower edge portion of door opening); and a beltline portion. Meanwhile, the pair of the doors are held on the vehicle body side portion by the door fixedly-holding means on the terminal edge portion sides in the middle portion in the vertical direction of the vehicle. Thus, when the first door out of the pair of the doors is disposed on the vehicle front side, the amount of displacement toward the rear of the vehicle is larger at upper and lower portions as compared to that of the portion held by the door fixedly-holding means on the vehicle body side portion.

However, in the vehicle door system according to the second aspect, the vehicle width direction surface formed in the first door is formed so that the more distant the position on the vehicle width direction surface is from the door fixedly-holding means in the vertical direction of the vehicle, the longer the distance along the longitudinal direction of the vehicle between the vehicle width direction surface and the second terminal edge portion becomes.

Thus, even when, in the first door, the amount of displacement toward the rear of the vehicle becomes larger at upper and lower portions as compared to that of the portion held by the door fixedly-holding means on the vehicle body side portion, it is possible to make the time, at which the vehicle width direction surface of the front door is brought into contact with the terminal edge portion of the rear door, substantially the same over the vertical extension. Thus, it is possible to suppress concentration of the force exerted by the terminal edge portion of the second door on the vehicle width direction surface of the first door, and it is possible to prevent the first door from being jammed inside the second door.

The vehicle width direction surface may be formed inclined so that, from the inner side, the more outward a position on the vehicle width direction surface is in the vehicle width direction, the closer the vehicle width direction surface becomes to the second terminal edge portion out of the pair of the first and second terminal edge portions.

According to this configuration, when the vehicle width direction surface of the first door is brought into contact with the terminal edge portion of the second door following a forward collision, for example, a component force is applied to the portion of the first door on the terminal edge portion side outwardly in the vehicle width direction because the vehicle width direction surface slides on the terminal edge portion of the second door. Thus, the portion of the first door on the terminal edge portion side is further pushed and displaced outwardly in the vehicle width direction, so that it is possible to prevent the first door from being jammed inside the second door.

At least the second door out of the pair of the first and second doors may be configured as a slide door in which a link arm, one end of which is freely pivotally connected to the vehicle body side portion, is freely pivotally connected to the second door on the other end side, and that slides with the link arm swinging.

The trajectory of the sliding movement of the terminal edge portion of this kind of link-arm type slide door lies along the vehicle width direction near the position at which the door is completely closed.

Accordingly, as described above, in a case where the vehicle width direction surface of the first door is brought into contact with the terminal edge portion of the second door following a forward collision or the like, and a component force is therefore applied to the portion of the first door on the terminal edge portion side outwardly in the vehicle width direction, when the second door out of the pair of the doors is configured as a link-arm type slide door, it is possible to push and displace the portion of the second door on the terminal edge portion side inwardly in the vehicle width direction owing to the door trajectory characteristic of the link-arm type slide door. In addition, when the pair of the doors are each configured as a link-arm type slide door, it is possible to push and displace the portion of the first door on the terminal edge portion side outwardly in the vehicle width direction, and at the same time, push and displace the portion of the second door on the terminal edge portion side inwardly in the vehicle width direction.

A vehicle door system according to a third aspect of the present invention includes: a pair of first and second doors that are arranged along a longitudinal direction of a vehicle on a side portion of a vehicle body, and that have first and second terminal edge portions, respectively, extending in a vertical direction of the vehicle, wherein states of the pair of the first and second doors include a first state where the pair of the first and second terminal edge portions face each other in the longitudinal direction of the vehicle, and a second state where the first terminal edge portion out of the pair of the first and second terminal edge portions is positioned more outwardly in the vehicle width direction than the second terminal edge portion; a drive unit that changes the state of the pair of the first and second doors from the first state to the second state; a collision detection device that outputs a collision signal in response to at least one of prediction and detection of a collision of the vehicle; and a controller that controls the drive unit so that the state of the pair of the first and second doors is changed from the first state to the second state in response to detection of the collision signal.

A vehicle door system according to a fourth aspect of the present invention includes: a pair of first and second doors that are arranged along a longitudinal direction of a vehicle on a side portion of a vehicle body, and that have first and second terminal edge portions, respectively, extending in a vertical direction of the vehicle; a member for fixedly holding the pair of the first and second doors on the vehicle body side portion on the terminal edge portion sides in a middle portion in the vertical direction of the vehicle, wherein the first door out of the pair of the first and second doors has a vehicle width direction surface that is formed along the first terminal edge portion more inwardly in the vehicle width direction than the first terminal edge portion, and that extends in the vehicle width direction, and the vehicle width direction surface is formed so that the more distant a position on the vehicle width direction surface is from the door fixedly-holding member in the vertical direction of the vehicle, the longer a distance along the longitudinal direction of the vehicle between the vehicle width direction surface and the second terminal edge portion becomes.

A fifth aspect of the present invention relates to a method of controlling a vehicle door system that includes a pair of first and second doors that are arranged along a longitudinal direction of a vehicle on a side portion of a vehicle body, and that have first and second terminal edge portions, respectively, extending in a vertical direction of the vehicle. The method includes the steps of: determining whether a collision of a vehicle will occur, or whether a collision of the vehicle has occurred; and, when it is determined that a collision of the vehicle will occur, or that a collision of the vehicle has occurred, changing the state of the pair of the first and second doors from a first state where the pair of the first and second terminal edge portions face each other in the longitudinal direction of the vehicle to a second state where the first terminal edge portion out of the pair of the first and second terminal edge portions is positioned more outwardly in the vehicle width direction than the second terminal edge portion.

As described above in detail, according to the present invention, it is possible to prevent the situation in which one door is jammed inside the other door at the time of a forward collision or the like, without causing various restrictions.

BRIEF DESCRIPTION OF THE DRAWINGS

The foregoing and further objects, features and advantages of the invention will become apparent from the following description of exemplary embodiments with reference to the accompanying drawings, wherein like numerals are used to represent like elements and wherein:

FIGS. 25A to 25C are important-part enlarged plan views in section of the vehicle in which the vehicle door system according to the fourth embodiment of the present invention is used, in a case where a forward collision has occurred.

DETAILED DESCRIPTION OF THE PREFERRED EMBODIMENTS

First Embodiment

A first embodiment of the present invention will be described below with reference to FIGS. 1 to 8.

Figure 1:
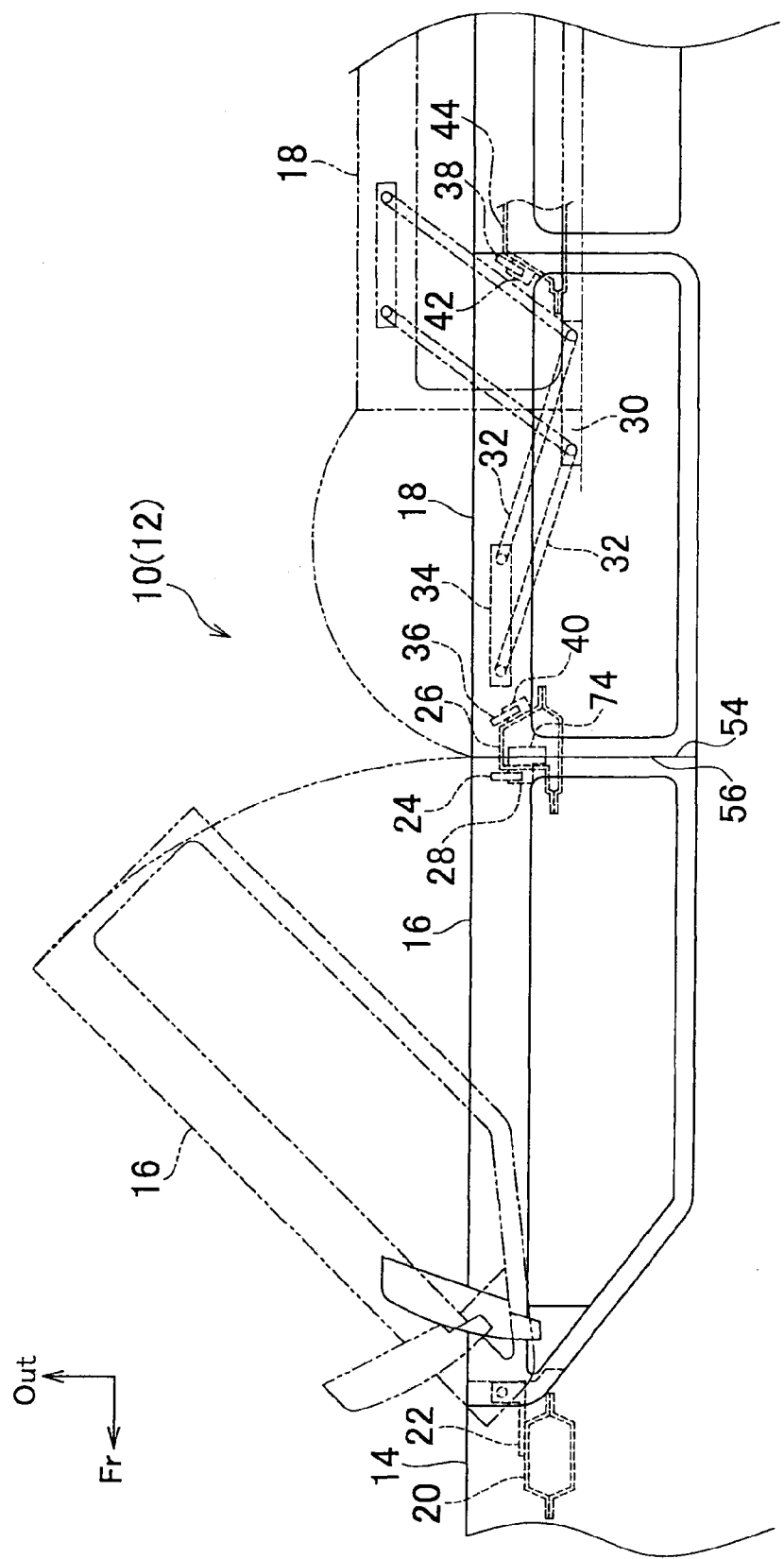
FIG. 1 is a plan view of a right side portion of a vehicle in which a vehicle door system according to a first embodiment of the present invention is used.
Figure 2:
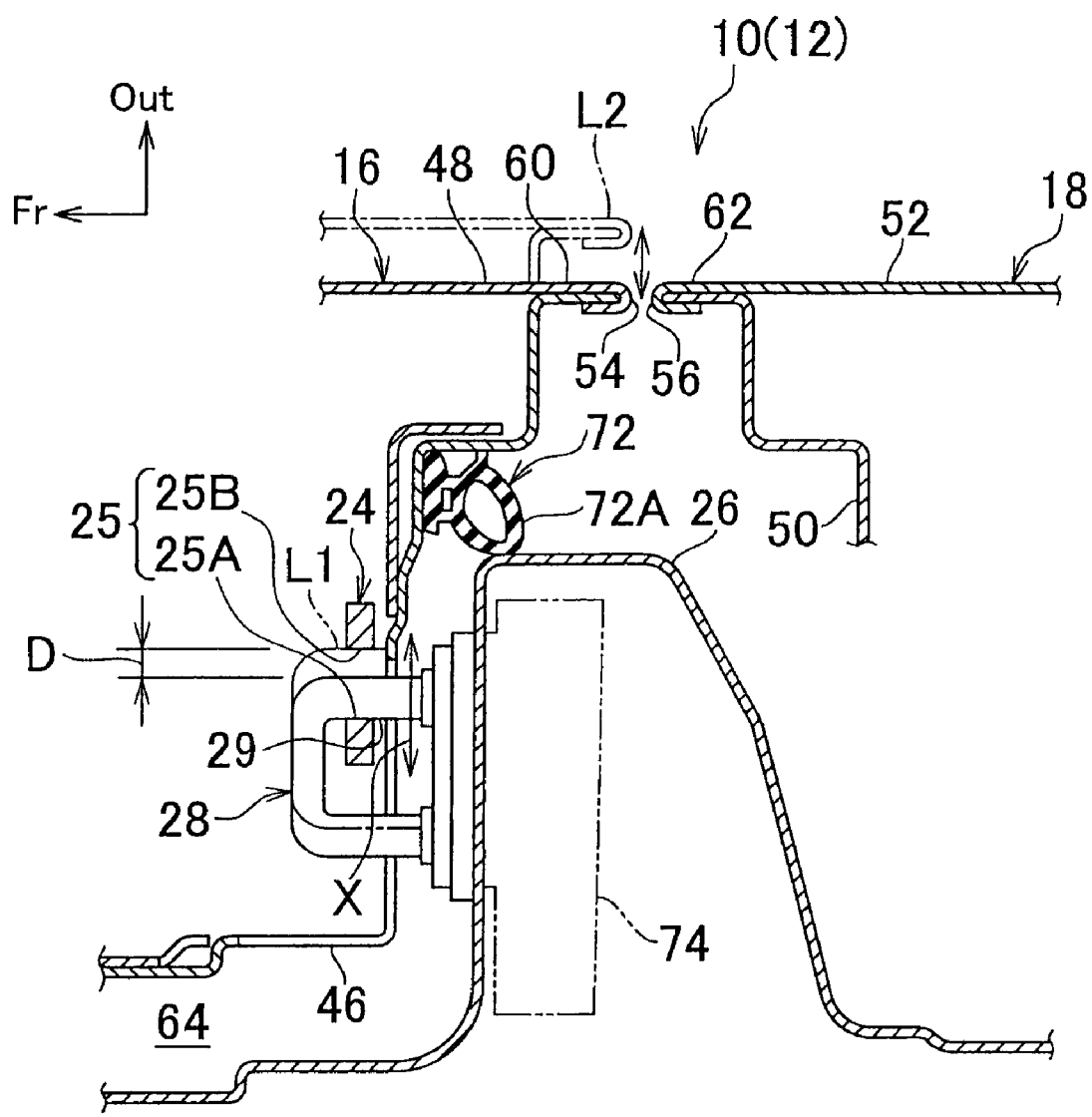
FIG. 2 is an important-part enlarged plan view in section of the vehicle in which the vehicle door system according to the first embodiment of the present invention is used.
Figure 3:
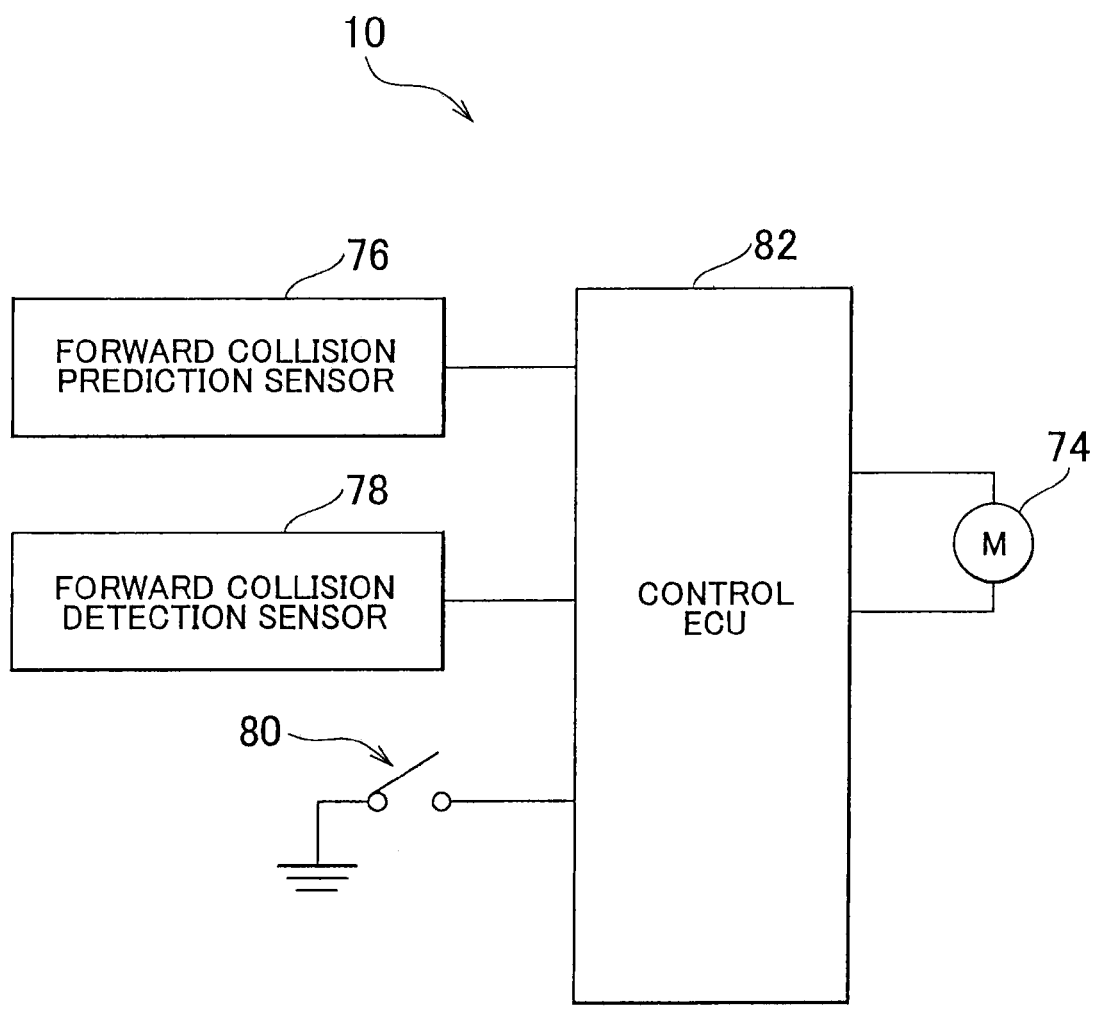
FIG. 3 is a block diagram showing an electric connection of the vehicle door system according to the first embodiment of the present invention.
Figure 4:
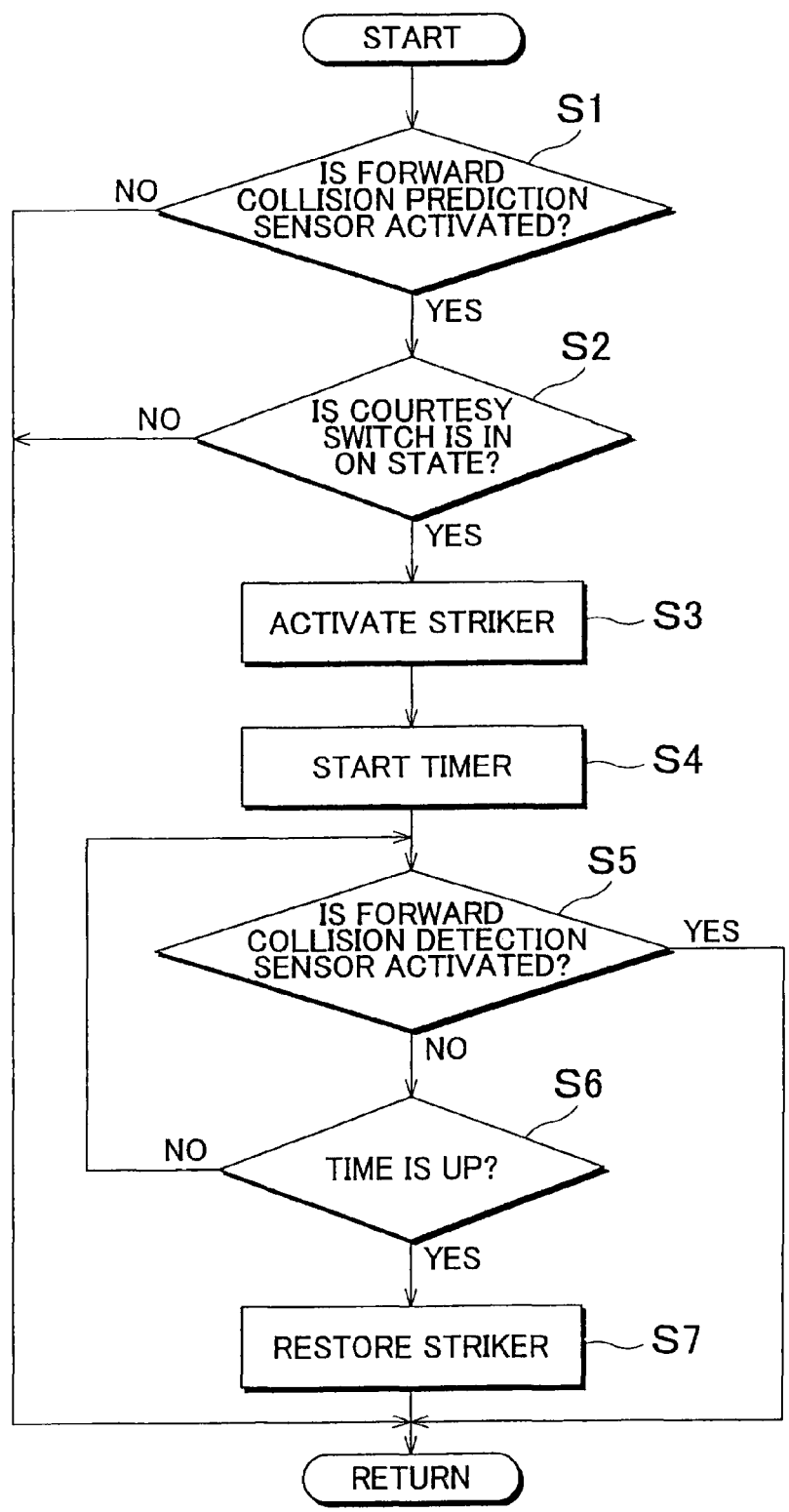
FIG. 4 is a flow chart showing a control flow of the vehicle door system according to the first embodiment of the present invention.

FIGS. 1 to 8 are diagrams showing the first embodiment of the present invention. FIG. 1 is a plan view of a right side portion of a vehicle 12 in which a vehicle door system 10 is used. FIG. 2 is an important-part enlarged plan view in section of the vehicle 12. FIG. 3 is a block diagram showing an electric connection of the vehicle door system 10. FIG. 4 is a flow chart showing a control flow of the vehicle door system 10. FIGS. 5 to 8B are diagrams showing a modification of the vehicle door system 10. In these figures, the arrows Up, Fr and Out indicate the upward direction in the vertical direction of the vehicle, the forward direction in the longitudinal direction of the vehicle, and the outward direction in the width direction of the vehicle, respectively.

First, a configuration of the vehicle 12 in which the vehicle door system 10 according to the first embodiment of the present invention is used will be described.

As shown in FIG. 1, the vehicle door system 10 according to the first embodiment of the present invention is suitably installed in the vehicle 12, such as a minivan, for example. In the vehicle 12 in which the vehicle door system 10 is used, a front door 16 and a rear door 18 are arranged on a vehicle body side portion 14 along the longitudinal direction of the vehicle.

The front door 16 is connected to a front pillar 20 with a door hinge 22 on the front end side of the front door 16, which is configured as a hinged swing door that pivots relative to the vehicle body side portion 14.

The front door 16 includes a door lock (not shown) that has a latch member 24 on the rear end side of the front door 16. The front door 16 is designed so that the latch member 24 of the door lock is engaged with a striker member 28 provided on a center pillar 26, whereby the front door 16 is fixedly held on the vehicle body side portion 14 in a door-closed state.

On the other hand, a link arm 32, one end of which is freely pivotally connected to the vehicle body side portion 14 (more specifically, to a rocker portion) through a hinge base 30, is freely pivotally connected to the rear door 18 with a door hinge 34 on the other end side. The rear door 18 is configured as a link-arm type slide door that slides with the link arm 32 swinging.

The rear door 18 includes: on the front end side, a door lock that has a latch member 36; and, on the rear end side, a door lock (neither door lock is shown) that has the latch member 38. The rear door 18 is designed so that a striker member 40 provided on the center pillar 26 is engaged with the latch member 36 of the front door lock, and a striker member 42 provided on a rear pillar 44 is engaged with a latch member 38 of the rear door lock, whereby the rear door 18 is fixedly held on the vehicle body side portion 14 in a door-closed state.

As shown in FIG. 2, the front door 16 includes: a door inner panel 46 disposed on the inner side with respect to the vehicle width direction; and a door outer panel 48 disposed on the outer side with respect to the vehicle width direction. The door inner panel 46 and the door outer panel 48 are joined together by hemming them along respective peripheral portions.

Similarly, the rear door 18 includes: a door inner panel 50 disposed on the inner side with respect to the vehicle width direction; and a door outer panel 52 disposed on the outer side with respect to the vehicle width direction. The door inner panel 50 and the door outer panel 52 are joined together by hemming them along respective peripheral portions.

In this embodiment, the rear edge portion of the front door 16 is formed into a terminal edge portion 54 that extends in the vertical direction of the vehicle, and the front edge portion of the rear door 18 is formed into a terminal edge portion 56 that extends in the vertical direction of the vehicle. As shown in FIG. 2, when the front door 16 and the rear door 18 are closed, the above-described terminal edge portions 54 and 56, which are provided on respective sides, are positioned so as to face each other in the longitudinal direction of the vehicle. The terminal edge portion herein means an edge portion of the outside portion of the door.

At the peripheral portion of the front door 16, a weather strip 72 is provided between the peripheral portion of the front door 16 and the edge portion of a door opening 64. As shown in FIG. 2, when the front door 16 is in a closed state, the weather strip 72 urges the entire front door 16 outwardly in the vehicle width direction against the edge portion of a door opening 64.

In particular, a rear end portion 72A of the whether strip 72 is extended in the vertical direction of the vehicle along the terminal edge portion 54, and is configured so as to urge a portion of the front door 16 on the terminal edge portion 54-side outwardly in the vehicle width direction along the terminal edge portion 54 extending in the vertical direction of the vehicle.

The latch member 24 provided on the front door 16 is configured to have a substantially U-shape when viewed from the front, including a concave, counterpart engagement portion 25 that is engaged with a rod-like engagement portion 29 of the striker member 28. The latch member 24 is designed so as to be able to pivot about an axis extending in the longitudinal direction of the vehicle. The counterpart engagement portion 25 of the latch member 24 is formed so as to have dimensions greater than the diameter of the engagement portion 29 of the striker member 28.

As shown in FIG. 2, when the front door 16 is in a closed state, the portion of the front door 16 at the rear end thereof on the terminal edge portion 54-side is urged outwardly in the vehicle width direction by the rear end portion 72A of the weather strip 72, as described above. Accordingly, in the above-described latch member 24, one of wall portions 25A and 25B of the counterpart engagement portion 25, that is, the wall portion 25A on the inner side with respect to the vehicle width direction is engaged with the engagement portion 29 of the striker member 28.

In addition, in this embodiment, the striker member 28 that engages with the above-described latch member 24 is designed so as to be movable in the vehicle width direction (X direction) relative to the center pillar 26. The center pillar 26 on which the striker member 28 is provided has a striker driving motor 74 within.

The striker driving motor 74 is constituted of a linear drive motor or the like, for example. The striker driving motor 74 is connected to the above-described striker member 28, and is configured to be able to cause the striker member 28 to move in the vehicle width direction (X direction).

As shown in FIG. 3, the vehicle door system 10 according to the first embodiment of the present invention includes a forward collision prediction sensor 76, a forward collision detection sensor 78, a courtesy switch 80, and a control ECU 82 (Electronic Control Unit), as electric components, in addition to the above-described striker driving motor 74.

The forward collision prediction sensor 76 and the forward collision detection sensor 78 are provided at appropriate locations, such as a front portion of the vehicle 12. The forward collision prediction sensor 76 is designed so as to be activated in response to the fact that a forward collision of the vehicle 12 is predicted, and output a collision prediction signal to the control ECU 82. The forward collision detection sensor 78 is designed so as to be activated in response to the fact that the forward collision of the vehicle 12 is detected, and output a collision detection signal to the control ECU 82. For example, an air bag sensor, an acceleration sensor, etc. that the vehicle 12 includes may be used as the forward collision prediction sensor 76 and the forward collision detection sensor 78.

The courtesy switch 80 is provided in the center pillar 26, for example, and is designed so as to be activated when the front door 16 is closed on the vehicle body side portion 14, and output a door-closed state detection signal to the control ECU 82.

The control ECU 82 has electric circuits, including a CPU, a ROM, a RAM, etc. and is configured so as to control the striker driving motor 74 based on the output signals from the forward collision prediction sensor 76, the forward collision detection sensor 78, and the courtesy switch 80. Operation of the control ECU 82 will be described along with operations and effects below.

Next, the operations and effects of the vehicle door system 10 according to the first embodiment of the present invention will be described along with the operation thereof, referring to the flow chart shown in FIG. 4 as needed.

The control ECU 82 shown in FIG. 3 is activated and starts a programmed process shown by the flow chart of FIG. 4 when the ignition switch of the vehicle 12 is turned on.

After the control ECU 82 starts the programmed process shown by the flow chart of FIG. 4, the control ECU 82 first performs detection of the output signal from the forward collision prediction sensor 76 shown in FIG. 3, and determines whether the forward collision prediction sensor 76 is activated, that is, whether the forward collision of the vehicle 12 is predicted (step S1).

The forward collision prediction sensor 76 outputs no collision prediction signal to the control ECU 82 while no forward collision of the vehicle 12 is predicted as the vehicle 12 is running. Accordingly, in this case, the control ECU 82 determines that the forward collision of the vehicle 12 is not predicted (NO in step S1), and the process returns.

On the other hand, when the forward collision of the vehicle 12 is predicted as the vehicle 12 is running, the forward collision prediction sensor 76 is activated and outputs a collision prediction signal to the control ECU 82. Accordingly, in this case, the control ECU 82 determines that the forward collision of the vehicle 12 is predicted (YES in step S1).

Subsequently, the control ECU 82 performs detection of the output signal from the courtesy switch 80 shown in FIG. 3, and determines whether the courtesy switch 80 is in an on state, that is, whether the front door 16 is closed on the vehicle body side portion 14 (step S2).

The courtesy switch 80 outputs no door-closed state detection signal to the control ECU 82 while the front door 16 shown in FIG. 1 is opened. Accordingly, in this case, the control ECU 82 determines that the front door 16 is not closed on the vehicle body side portion 14 (NO in step S2), and the process returns.

On the other hand, when the front door 16 is closed on the vehicle body side portion 14, the courtesy switch 80 is in an on state, and outputs the door-closed state detection signal to the control ECU 82. Accordingly, in this case, the control ECU 82 determines that the front door 16 is closed on the vehicle body side portion 14 (YES in step S2).

The control ECU 82 outputs an activation signal to the striker driving motor 74 shown in FIGS. 2 and 3 (step S3). When receiving the activation signal from the control ECU 82, the striker driving motor 74 is activated, and causes the striker member 28 to move outwardly in the vehicle width direction as shown by the chain double-dashed line L1 in FIG. 2. The amount of displacement of the striker member 28 at this time is set equal to the distance D between the engagement portion 29 of the striker member 28 and the counterpart engagement portion 25 of the latch member 24.

In this way, the front door 16 is brought into a state where the front door 16 is enabled to pivot outwardly in the vehicle width direction about the pivotal axis of the door hinge 22 by the distance D between the engagement portion 29 of the striker member 28 and the counterpart engagement portion 25 of the latch member 24. In addition, at this time, the rear end portion 72A of the weather strip 72 urges the portion of the front door 16 on the terminal edge portion 54-side outwardly in the vehicle width direction along the terminal edge portion 54 that extends in the vertical direction of the vehicle. Accordingly, the portion of the front door 16 on the terminal edge portion 54-side is pushed and displaced outwardly in the vehicle width direction as the striker member 28 moves outwardly in the vehicle width direction with the wall portion 25A of the counterpart engagement portion 25 of the latch member 24 engaged with the engagement portion 29 of the striker member 28.

Under conditions where the portion of the front door 16 on the terminal edge portion 54-side has been pushed and displaced outwardly in the vehicle width direction in this way, a state is brought about in which, as shown by the chain double-dashed line L2 in FIG. 2, the terminal edge portion 54 at the rear end of the front door 16 is positioned more outwardly in the vehicle width direction than the terminal edge portion 56 at the front end of the rear door 18. It should be noted that the driving operation of the striker driving motor 74 described above is performed and completed immediately after the forward collision of the vehicle 12 is predicted.

In this way, in the vehicle door system 10 according to the first embodiment of the present invention, when the forward collision prediction sensor 76 predicts a forward collision of the vehicle 12, the state of a pair of the front and rear doors 16 and 18 is immediately changed from a state (first state) where the pair of the terminal edge portions 54 and 56, with which the front and rear doors 16 and 18 are provided on respective sides, are positioned so as to face each other in the longitudinal direction of the vehicle to a state (second state) where the terminal edge portion 54 at the rear end of the front door 16 is positioned more outwardly in the vehicle width direction than the terminal edge portion 56 at the front end of the rear door 18.

As described above, the control ECU 82 starts a timer after outputting the activation signal to the striker driving motor 74 (step S4). Subsequently, the control ECU 82 performs detection of the output signal from the forward collision detection sensor 78, and determines whether the forward collision detection sensor 78 has been activated, that is, whether a forward collision of the vehicle 12 has been detected (step S5).

When detecting the forward collision of the vehicle 12 as the vehicle 12 is running, the forward collision detection sensor 78 is activated and outputs a collision detection signal to the control ECU 82. Accordingly, in this case, the control ECU 82 determines that a forward collision of the vehicle 12 has been detected (YES in step S5), and the process returns. It should be noted that, in this case, the control ECU 82 may exit the series of programmed steps.

In this case, as shown by the chain double-dashed line L2 in FIG. 2, the state (second state) where the terminal edge portion 54 at the rear end of the front door 16 is positioned more outwardly in the vehicle width direction than the terminal edge portion 56 at the front end of the rear door 18, is maintained. Thus, even when the front door 16 moves toward the rear door 18 side (that is, toward the rear of the vehicle) due to the forward collision or the like that has occurred after the forward collision is predicted, for example, it is possible to prevent the situation in which the front door 16 is jammed inside the rear door 18, more specifically, the situation in which a rear-end hemmed portion 60 of the front door 16 gets inside a front-end hemmed portion 62 of the rear door 18 with respect to the vehicle width direction.

On the other hand, while no forward collision of the vehicle 12 is detected as the vehicle 12 is running, the forward collision detection sensor 78 outputs no forward collision detection signal to the control ECU 82. Thus, in this case, the control ECU 82 determines that no forward collision of the vehicle 12 has been detected (NO in step S5).

Then, the control ECU 82 reads the count value of the timer and determines whether the count value exceeds a predetermined value, that is, whether time is up (step S6). When the control ECU 82 determines that time is not up (NO in step S6), the process returns to the above-described step S5, and the control ECU 82 again determines whether a forward collision of the vehicle 12 has been detected (step S5).

When the forward collision prediction sensor 76 predicts a forward collision of the vehicle 12, and the vehicle 12 then avoids the forward collision, for example, no collision detection signal is output to the control ECU 82. Accordingly, while the control ECU 82 is repeatedly performing the process from step S5 to step S6 described above, the count value of the timer exceeds the predetermined value. When the count value of the timer exceeds the predetermined value, the control ECU 82 determines that time is up (YES in step S6).

Subsequently, the control ECU 82 outputs a restoration signal to the striker driving motor 74 (step S7). When receiving the restoration signal from the control ECU 82, the striker driving motor 74 effectuates inverse driving to move the striker member 28 from the position indicated by the chain double-dashed line L1 in FIG. 2 inwardly in the vehicle width direction. Thus, the latch member 24 is retracted inwardly in the vehicle width direction by the striker member 28, which brings about a state where the front door 16 is closed on the vehicle body side portion 14.

Under ordinary conditions where the forward collision or the like is not occurring, the pair of the terminal edge portions 54 and 56, with which the front and rear doors 16 and 18 are provided on respective sides, are positioned so as to face each other in the longitudinal direction of the vehicle.

In this way, with the vehicle door system 10 according to the first embodiment of the present invention, when the forward collision prediction sensor 76 predicts a forward collision of the vehicle 12, and the vehicle 12 then avoids the forward collision, for example, the state of the pair of the front and rear doors 16 and 18 is restored from the state (second state) where the terminal edge portion 54 of the front door 16 is positioned more outwardly in the vehicle width direction than the terminal edge portion 56 of the rear door 18, to the state (first state) where the pair of the terminal edge portions 54 and 56 are positioned so as to face each other in the longitudinal direction of the vehicle. In this state, the space between the terminal edge portion 54 of the front door 16 and the terminal edge portion 56 of the rear door 18 is narrowed, whereby good appearance of the front and rear doors 16 and 18 is obtained.

As described above in detail, with the vehicle door system 10 according to the first embodiment of the present invention, when the forward collision prediction sensor 76 predicts a forward collision of the vehicle 12, the state of the pair of the front and rear doors 16 and 18 is immediately changed to the state (second state) where the terminal edge portion 54 at the rear end of the front door 16 is positioned more outwardly in the vehicle width direction than the terminal edge portion 56 at the front end of the rear door 18. Thus, even when the front door 16 moves toward the rear door 18 side (that is, toward the rear of the vehicle) due to the forward collision or the like that has occurred after the forward collision is predicted, it is possible to prevent the situation in which the front door 16 is jammed inside the rear door 18, more specifically, the situation in which the rear-end hemmed portion 60 of the front door 16 gets inside the front-end hemmed portion 62 of the rear door 18 with respect to the vehicle width direction. In this way, it is possible to ensure the opening operation of the front door 16 with no interference from the rear door 18.

In addition, with the vehicle door system 10 according to the first embodiment of the present invention, when a collision of the vehicle 12 is predicted, and the striker member 28 is therefore moved outwardly in the vehicle width direction, the urging force from the rear end portion 72A of the weather strip 72 urges the portion of the front door 16 on the terminal edge portion 54-side outwardly in the vehicle width direction along the terminal edge portion 54 extending in the vertical direction of the vehicle. Accordingly, vertically one-sided application of the urging force to the portion of the front door 16 on the terminal edge portion 54-side is restricted, so that it is possible to suppress the occurrence of unevenness in the amount of outward movement in the vehicle width direction between upper and lower portions of the front door 16. Thus, it is possible to prevent the situation in which a part of the front door 16 is partially jammed inside the rear door 18, that is, the situation in which one of upper and lower portions of the rear-end hemmed portion 60 of the front door 16 gets into the inner side of the front-end hemmed portion 62 of the rear door 18 with respect to the vehicle width direction.

With the vehicle door system 10 according to the first embodiment of the present invention, even when a collision of the vehicle 12 is predicted, and the striker member 28 is therefore moved outwardly in the vehicle width direction, the engagement between the striker member 28 and the latch member 24 is maintained. Thus, even when a forward collision or the like of the vehicle 12 occurs, it is possible to maintain the state where the portion of the front door 16 on the terminal edge portion 54-side is held on the vehicle body side portion 14.

In addition, with the vehicle door system 10 according to the first embodiment of the present invention, it is possible to position the terminal edge portion 54 of the front door 16 more outwardly in the vehicle width direction than the terminal edge portion 56 of the rear door 18, regardless of whether the front door 16 is moved toward the rear door 18 side (that is, toward the rear of the vehicle) because of a forward collision or the like. Thus, it is unnecessary to add any members (such as seesaw members and cams) between the front door 16 and the center pillar 26, for example, and the flexibility of the configuration between the front door 16 and the center pillar 26 is enhanced.

In addition, with the vehicle door system 10 according to the first embodiment of the present invention, it is unnecessary to reserve a wide space between the terminal edge portion 54 of the front door 16 and the terminal edge portion 56 of the rear door 18, which makes it possible to dispose the terminal edge portion 54 of the front door 16 and the terminal edge portion 56 of the rear door 18 close to each other. Accordingly, it is also possible to obtain good appearance of the front and rear doors 16 and 18 by narrowing the space between the terminal edge portion 54 of the front door 16 and the terminal edge portion 56 of the rear door 18.

With the vehicle door system 10 according to the first embodiment of the present invention, when the forward collision prediction sensor 76 predicts a forward collision of the vehicle 12, and the vehicle 12 then avoids the forward collision, for example, the state of the pair of the front and rear doors 16 and 18 is restored from the state (second state) where the terminal edge portion 54 of the front door 16 is positioned more outwardly in the vehicle width direction than the terminal edge portion 56 of the rear door 18 to the state (first state) where the pair of the terminal edge portions 54 and 56 are positioned so as to face each other in the longitudinal direction of the vehicle. In this way, it is possible to prevent the situation in which, despite the fact that no forward collision or the like of the vehicle 12 is occurring, the terminal edge portion 54 of the front door 16 is left positioned more outwardly in the vehicle width direction than the terminal edge portion 56 of the rear door 18.

Next, a modification of the vehicle door system 10 according to the first embodiment of the present invention will be described.

Figure 5:
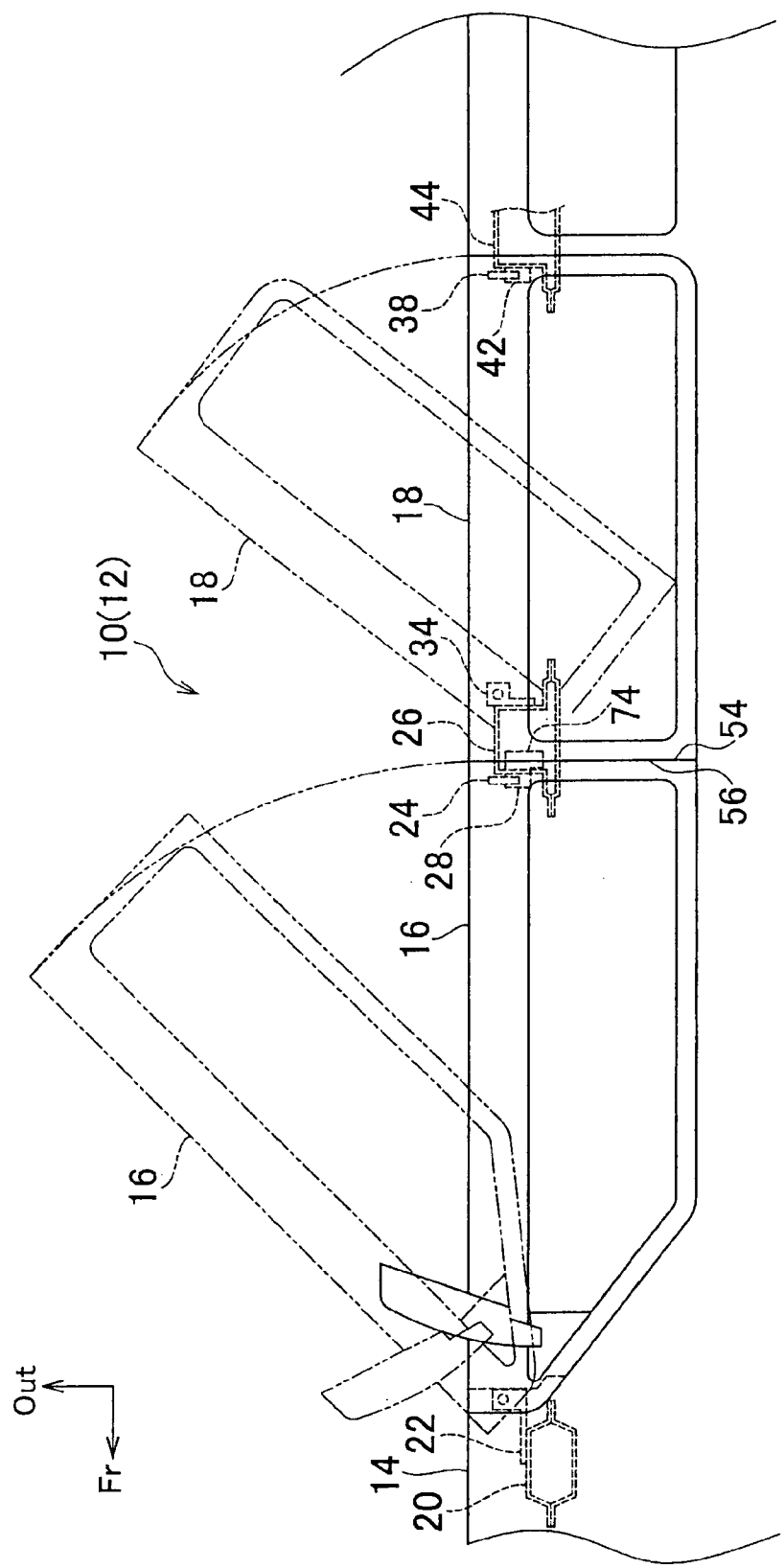
FIGS. 5 to 7 are diagrams showing a modification of the vehicle door system according to the first embodiment of the present invention.

In the above embodiment, the rear door 18 is configured as a link-arm type slide door that slides with the link arm 32 swinging. However, as shown in FIG. 5, the rear door 18 may be configured as a hinged swing door that is connected to the center pillar 26 through a door hinge 34 on the front end side of the door, and that pivots relative to the vehicle body side portion 14.

In addition, the vehicle door system 10 may be configured so that, when a forward collision of the vehicle 12 is predicted, the portion of the front door 16 on the terminal edge portion 54-side is pushed and displaced outwardly in the vehicle width direction as the striker member 28 moves outwardly in the vehicle width direction, and the state of the pair of the front and rear doors 16 and 18 is thus changed to the state (second state; see FIG. 2) where the terminal edge portion 54 at the rear end of the front door 16 is positioned more outwardly in the vehicle width direction than the terminal edge portion 56 at the front end of the rear door 18.

Figure 6:
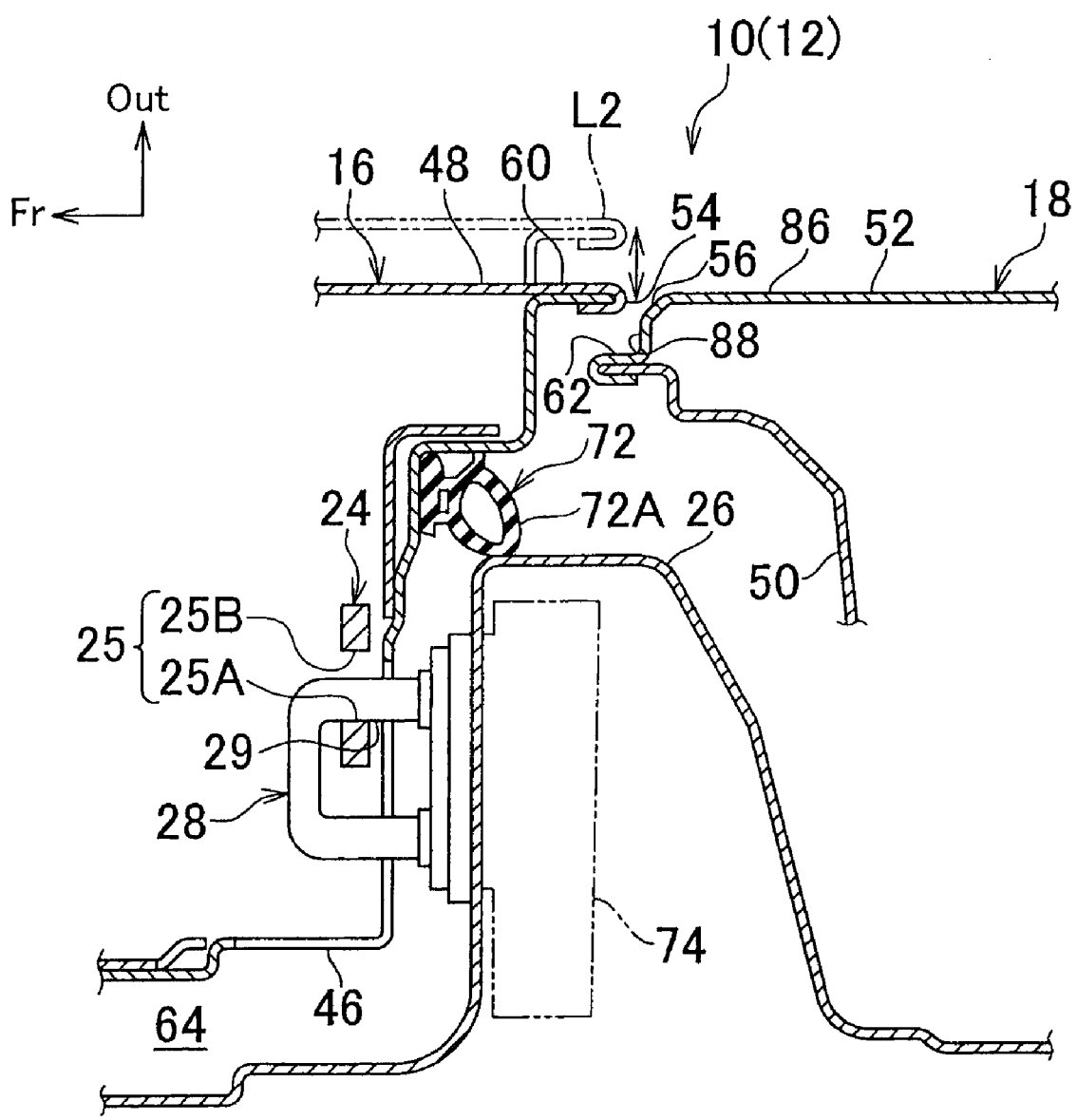

In this case, as shown in FIG. 6, a so-called "stepped, hemmed structure" may be adopted at the front end portion of the rear door 18. Specifically, the outer peripheral portion on the front end side of the door outer panel 52 of the rear door 18 is offset to a position more inward in the vehicle width direction than that of an outer surface portion 86 by providing a step portion 88, and is joined to the outer peripheral portion of the door inner panel 50 by hemming. In addition, the modification is configured so that the terminal edge portions 54 and 56, which are provided on respective sides, are positioned so as to face each other in the longitudinal direction of the vehicle when the front and rear doors 16 and 18 are closed, as shown in FIG. 6.

In addition, the vehicle door system 10 may be configured so that, when the a forward collision of the vehicle 12 is predicted, the state of the pair of the front and rear doors 16 and 18 is changed to the state (second state) where the terminal edge portion 54 at the rear end of the front door 16 is positioned more outwardly in the vehicle width direction than the terminal edge portion 56 at the front end of the rear door 18, as shown by the chain double-dashed line L2 in FIG. 6.

With such a configuration, even when the front door 16 is moved toward the rear door 18 side (that is, toward the rear of the vehicle) due to a forward collision or the like, for example, it is possible to prevent the situation in which the front door 16 is jammed inside the rear door 18, more specifically, the rear-end hemmed portion 60 of the front door 16 strikes the step portion 88 at the front end of the rear door 18. In this way, it is possible to ensure the opening operation of the front door 16 with no interference from the rear door 18.

Figure 7:
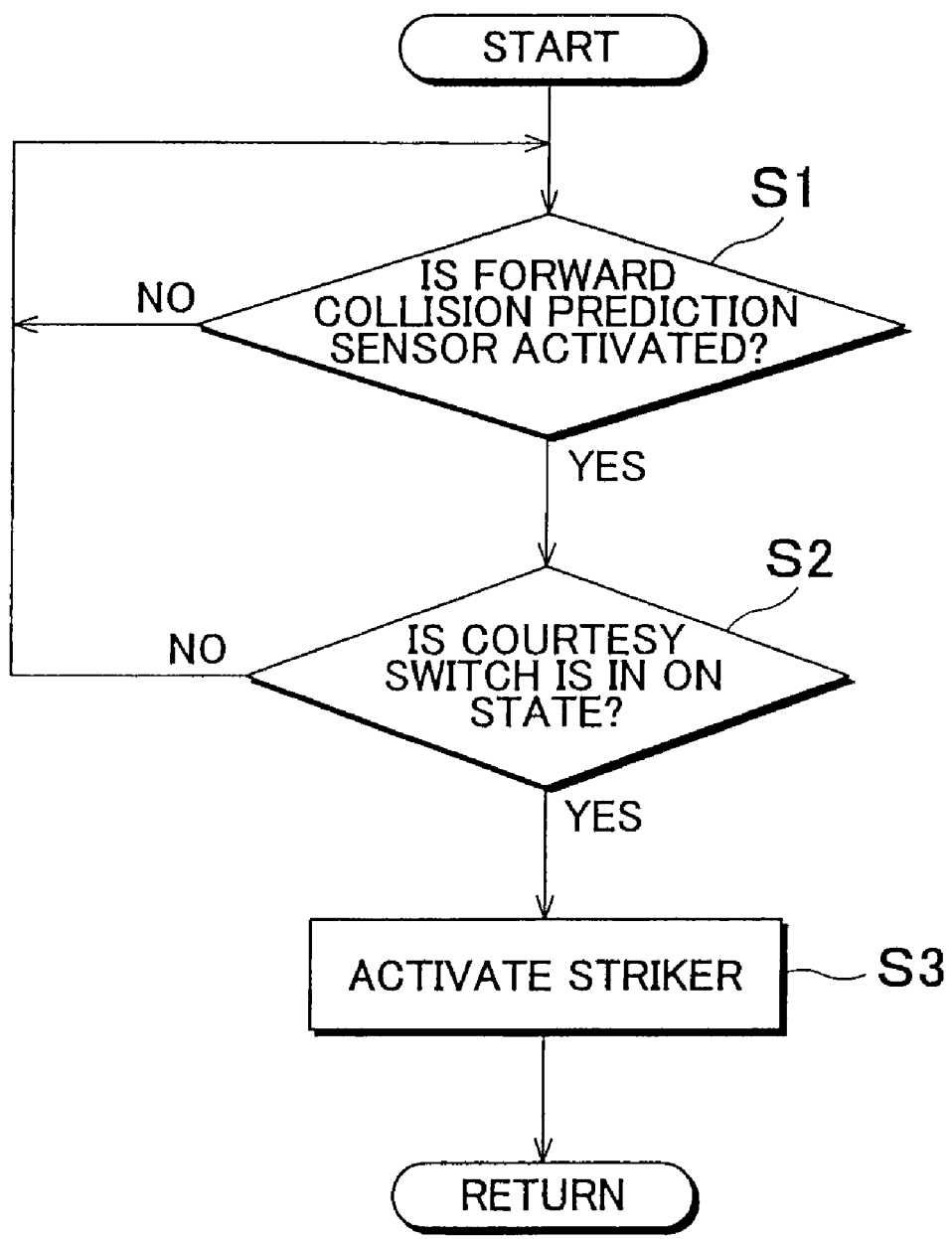

In the above embodiment, the control ECU 82 is configured so as to start the timer and perform detection of the output signal from the collision detection sensor after outputting the activation signal to the striker driving motor 74 in the process of step S3. However, the control ECU 82 may be configured so that the process returns after the control ECU 82 outputs the activation signal to the striker driving motor 74 in the step of S3, as shown in FIG. 7.

In the above embodiment, the control ECU 82 is configured so as to perform detection of the output signal from the courtesy switch 80 and determine whether the courtesy switch 80 is in an on state, that is, whether the front door 16 is closed on the vehicle body side portion 14 in the process of step S2. However, the control ECU 82 may be configured so as to perform a programmed process in which the process of step S2 is omitted. In other words, the present invention is not limited to the configuration in which the striker member 28 is moved outwardly in the vehicle width direction on the condition that the front door is closed on the vehicle body side portion 14.

The above embodiment is configured so that whether a forward collision of the vehicle 12 is predicted and whether the same is detected are determined based on the output signals from the forward collision prediction sensor 76 and the forward collision detection sensor 78. However, the vehicle door system 10 may be configured so as to determine whether a forward collision of the vehicle 12 is predicted and whether a forward collision of the vehicle 12 is detected, in a comprehensive manner by using, in combination, output signals from an air bag sensor, an acceleration sensor, etc. provided in the vehicle 12, in addition to the output signals from the forward collision prediction sensor 76 and the forward collision detection sensor 78.

In the above embodiment, the vehicle door system 10 is configured so that the striker member 28 is moved outwardly in the vehicle width direction when the collision prediction signal from the forward collision prediction sensor 76 is detected. However, the vehicle door system 10 may be configured so that the striker member 28 is moved outwardly in the vehicle width direction when the collision detection signal from the forward collision detection sensor 78 is detected.

In the above embodiment, the vehicle door system 10 is configured so that, when the front door 16 is closed on the vehicle body side portion 14 and the courtesy switch 80 is in an on state, the striker member 28 is moved outwardly in the vehicle width direction. However, in addition to such a configuration, a configuration may be adopted in which an occupancy sensor that is in an activated state while an occupant is sitting is provided for each front seat, and the striker member 28 is moved outwardly in the vehicle width direction when the occupancy sensor is in an activated state and the courtesy switch 80 is in an on state (AND condition), or when the occupancy sensor is in an activated state or the courtesy switch 80 is in an on state (OR condition).

In the above embodiment, the vehicle door system 10 is configured so that the portion of the front door 16 on the terminal edge portion 54-side is pushed and displaced outwardly in the vehicle width direction in the following manner: the striker member 28 is moved outwardly in the vehicle width direction, which brings about a state where the front door 16 is enabled to pivot outwardly in the vehicle width direction about the pivotal axis of the door hinge 22; and the rear end portion 72A of the weather strip 72 urges the portion of the front door 16 on the terminal edge portion 54-side outwardly in the vehicle width direction along the terminal edge portion 54 that extends in the vertical direction of the vehicle. However, the vehicle door system 10 may also be configured as described below.

Figure 8A:
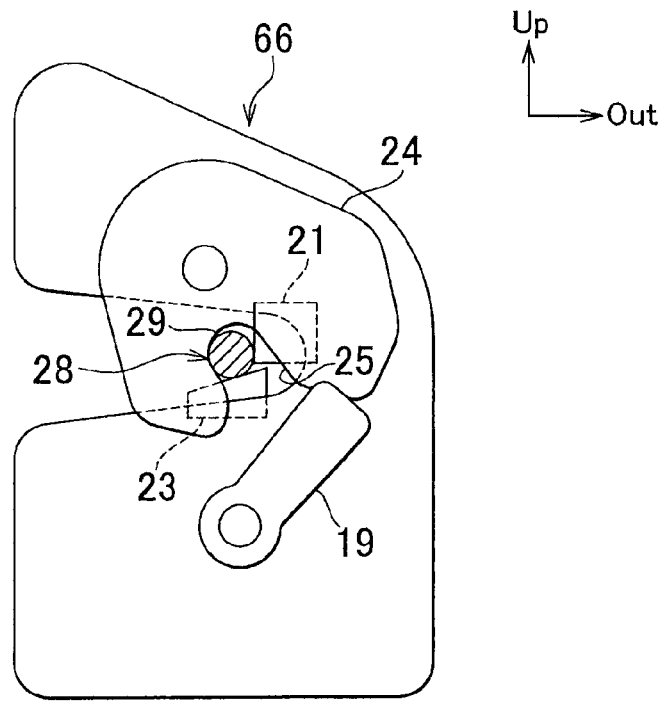
FIGS. 8A and 8B are diagrams showing the modification of the vehicle door system according to the first embodiment of the present invention.
Figure 8B:
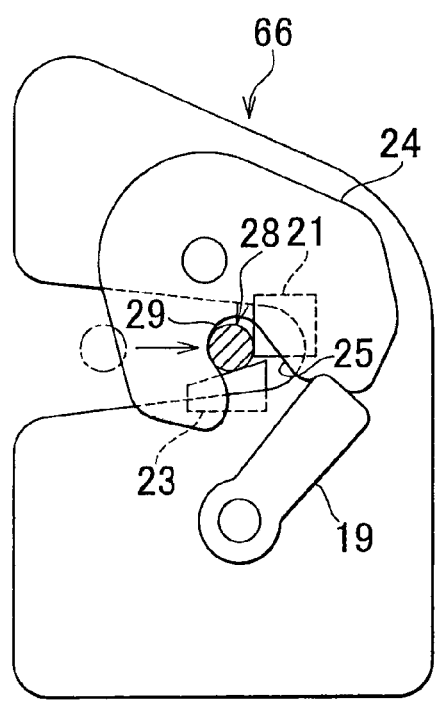

Specifically, in a modification shown in FIGS. 8A and 8B, a stopper rubber 21 and a slide lock 23 are provided in a door lock 66 that is provided in the front door 16. A pole 19 prevents rotation of the latch member 24. In the door lock 66, when the front door 16 is closed, the stopper rubber 21 is brought into contact with the engagement portion 29 of the striker member 28 and presses the striker member 28 inwardly in the vehicle width direction, and the slide lock 23 is brought into contact with the engagement portion 29 of the striker member 28 and presses the striker member 28 upward in the vertical direction of the vehicle with the inclined surface of the slide lock 23. Thus, the engagement portion 29 of the striker member 28 is engaged with a wall portion 25A, which is the inner one of wall portions 25A and 25B of the counterpart engagement portion 25 of the latch member 24 with respect to the vehicle width direction, whereby a state is achieved where the rattling of the engagement portion 29 of the striker member 28 is suppressed.

Starting from this state, when, as described above, the forward collision prediction sensor 76 predicts a forward collision of the vehicle 12, and the striker member 28 therefore moves outwardly in the vehicle width direction, the stopper rubber 21 is pushed outwardly in the vehicle width direction by the engagement portion 29 of the striker member 28 as shown in FIG. 8B, and thus the portion of the front door 16 on the terminal edge portion 54-side is pushed and displaced outwardly in the vehicle width direction. The portion of the front door 16 on the terminal edge portion 54-side may be pushed and displaced outwardly in the vehicle width direction by the force exerted by the outward movement of the striker member 28 with respect to the vehicle width direction.

Second Embodiment

A second embodiment of the present invention will be described below with reference to FIGS. 9 to 15.

Figure 9:
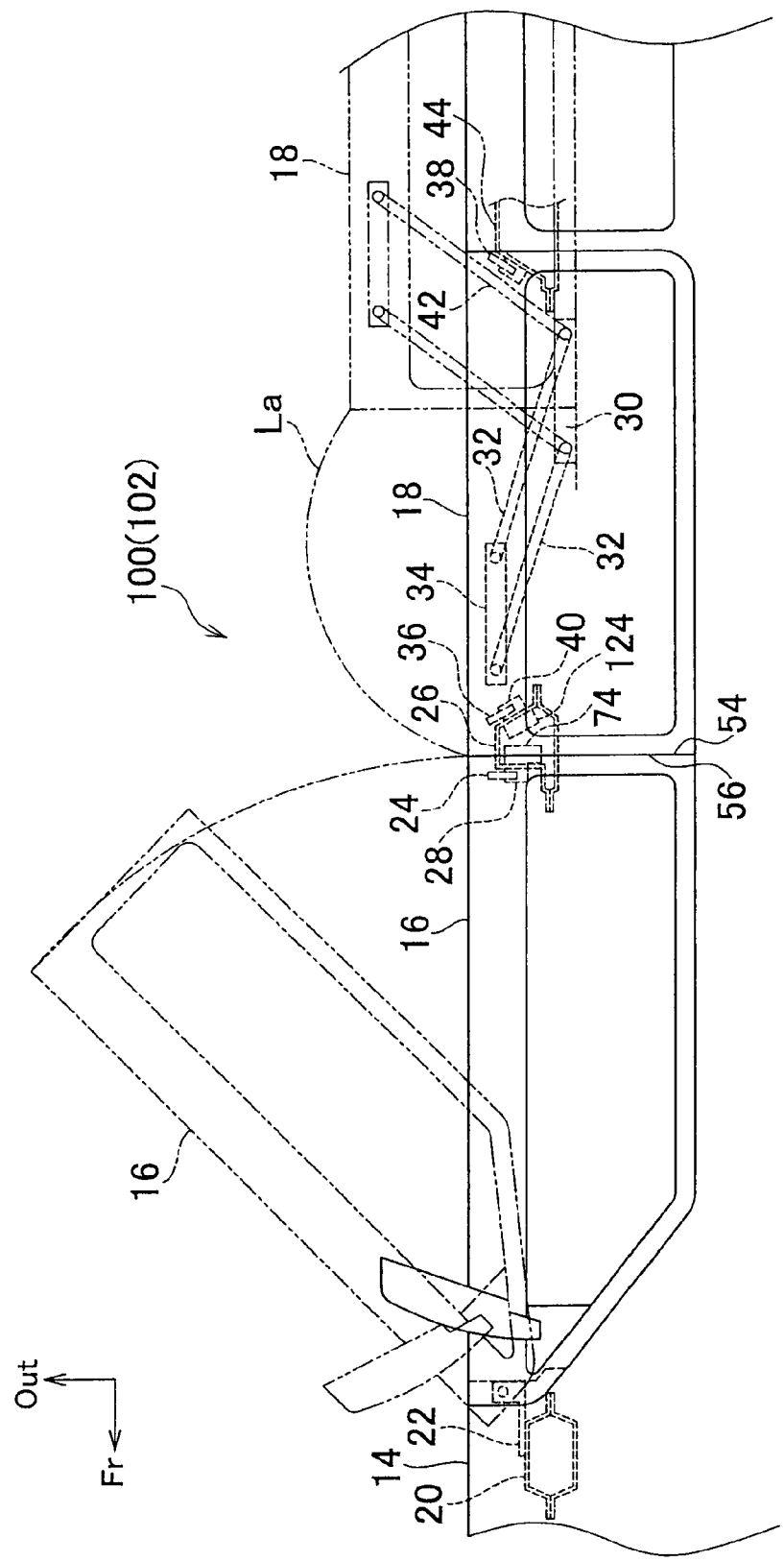
FIG. 9 is a plan view of a right side portion of a vehicle in which a vehicle door system according to a second embodiment of the present invention is used.
Figure 10:
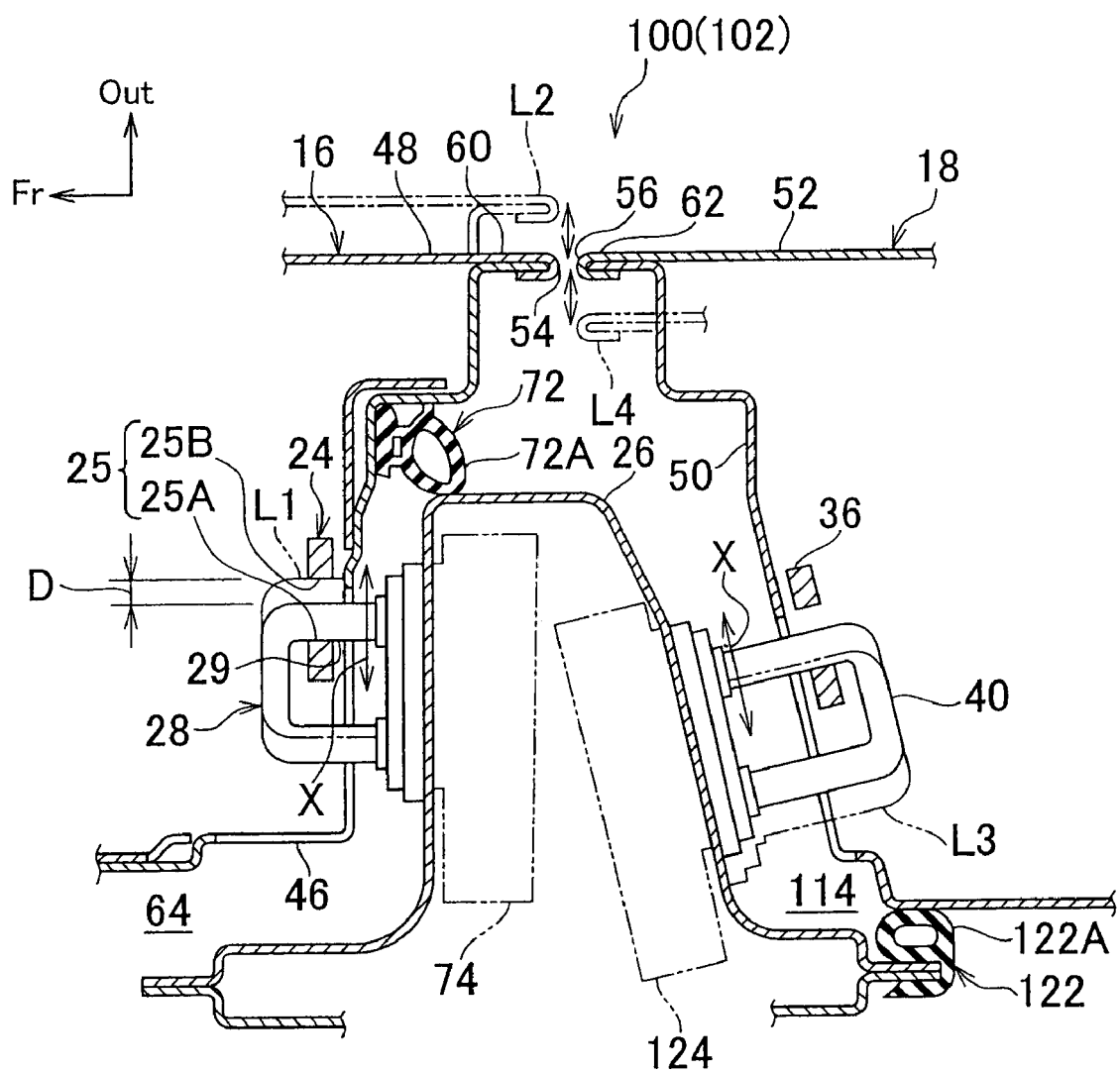
FIG. 10 is an important-part enlarged plan view in section of the vehicle in which the vehicle door system according to the second embodiment of the present invention is used.
Figure 11:
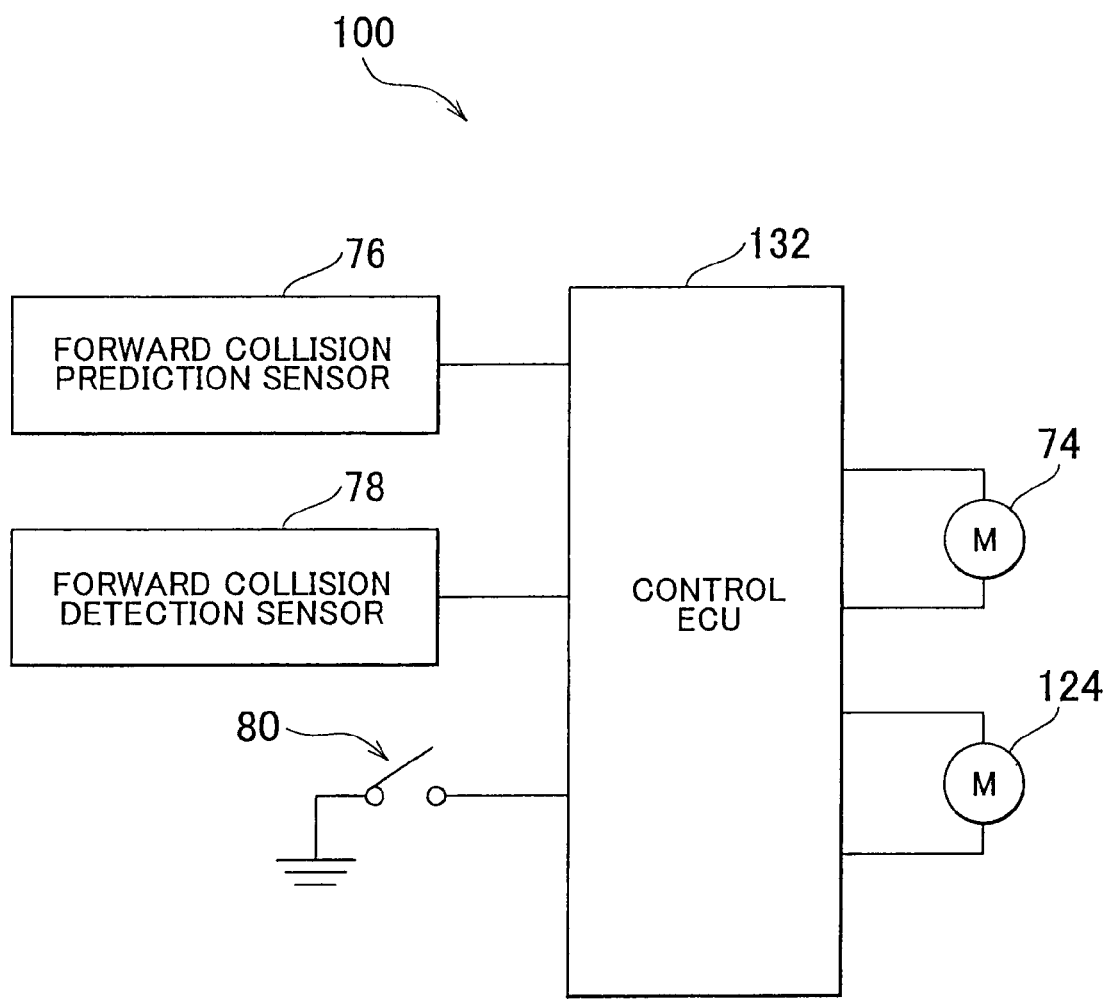
FIG. 11 is a block diagram showing an electric connection of the vehicle door system according to the second embodiment of the present invention.
Figure 12:
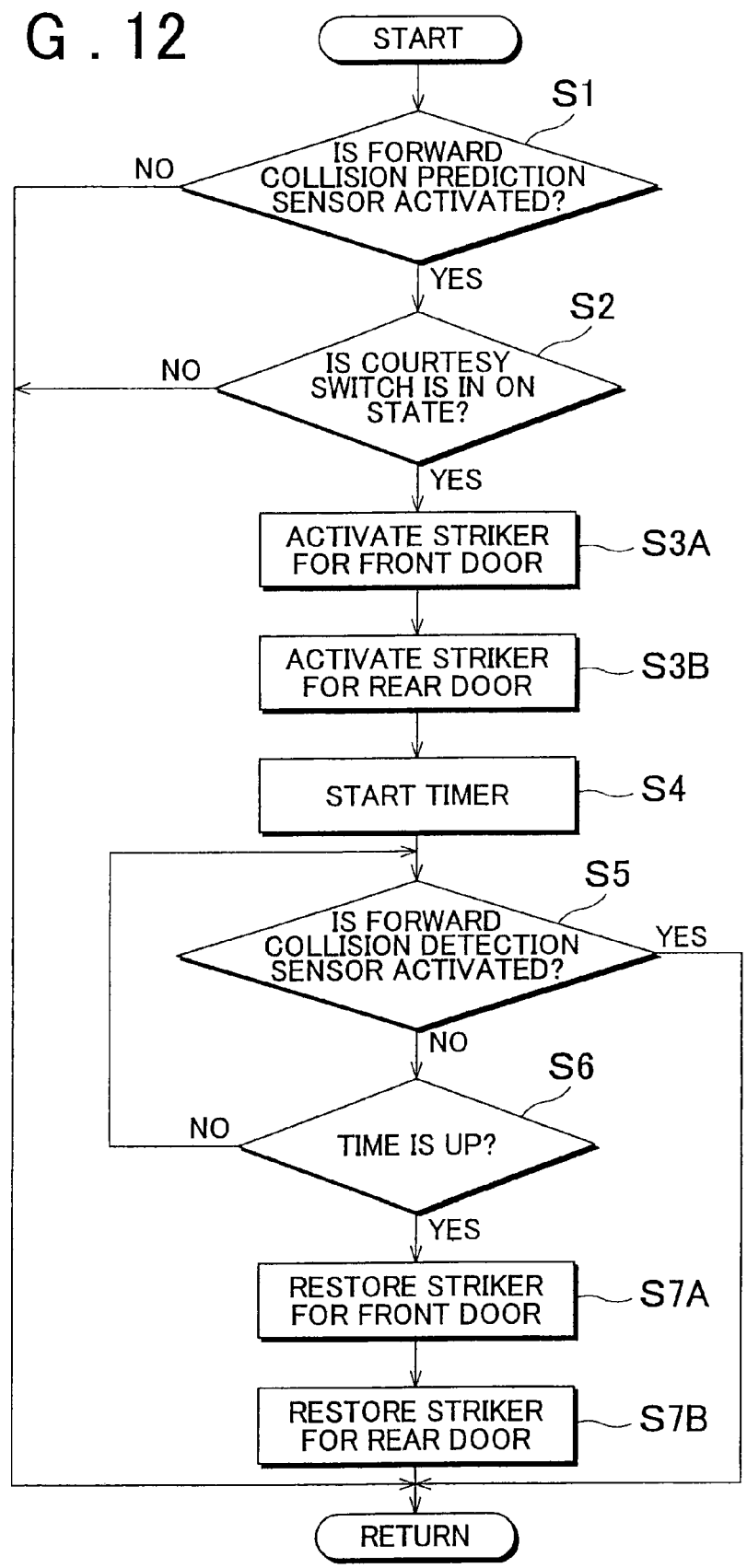
FIG. 12 is a flow chart showing a control flow of the vehicle door system according to the second embodiment of the present invention.
Figure 13:
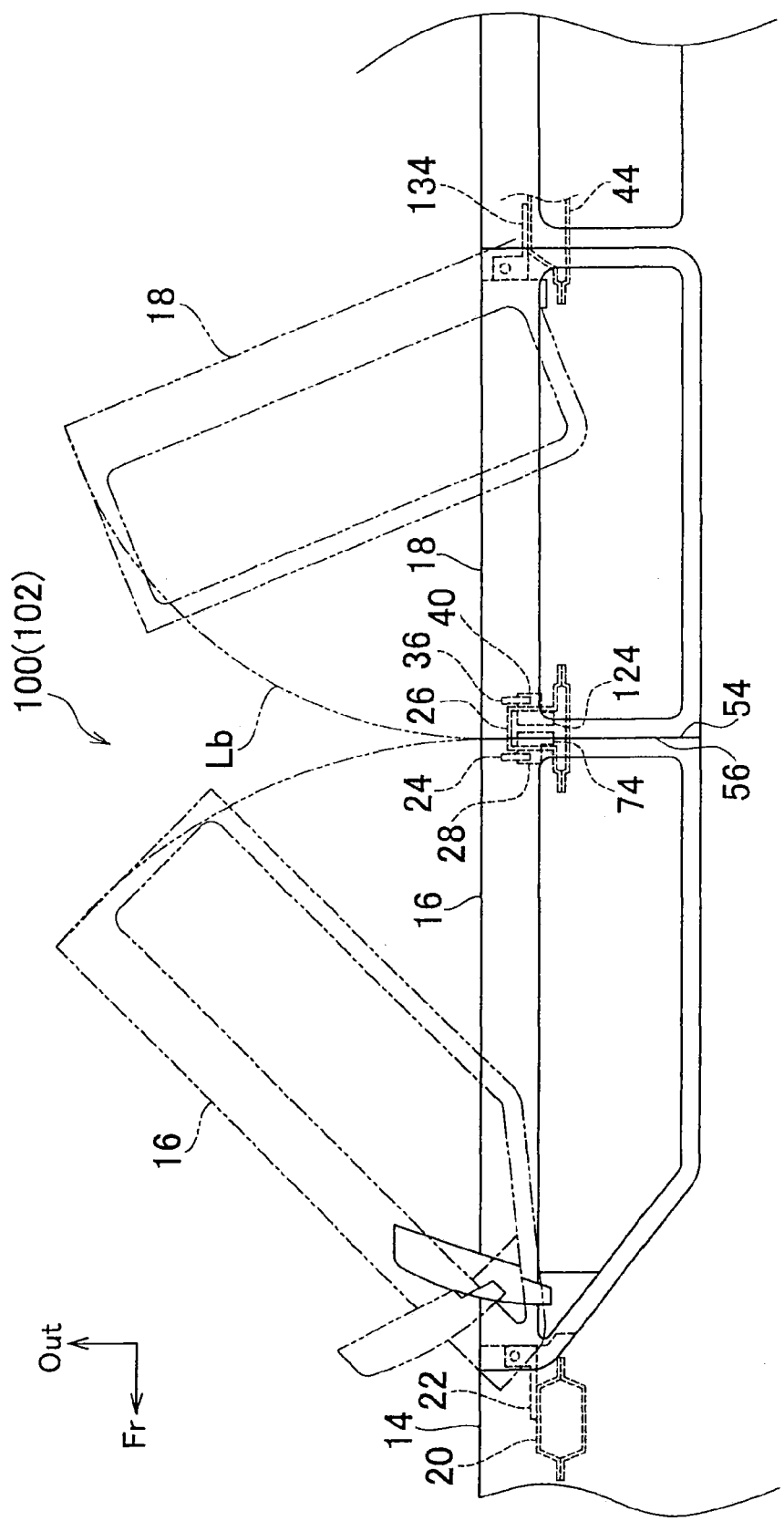
FIG. 13 is a diagram showing a modification of the vehicle door system according to the second embodiment of the present invention.
Figure 14:
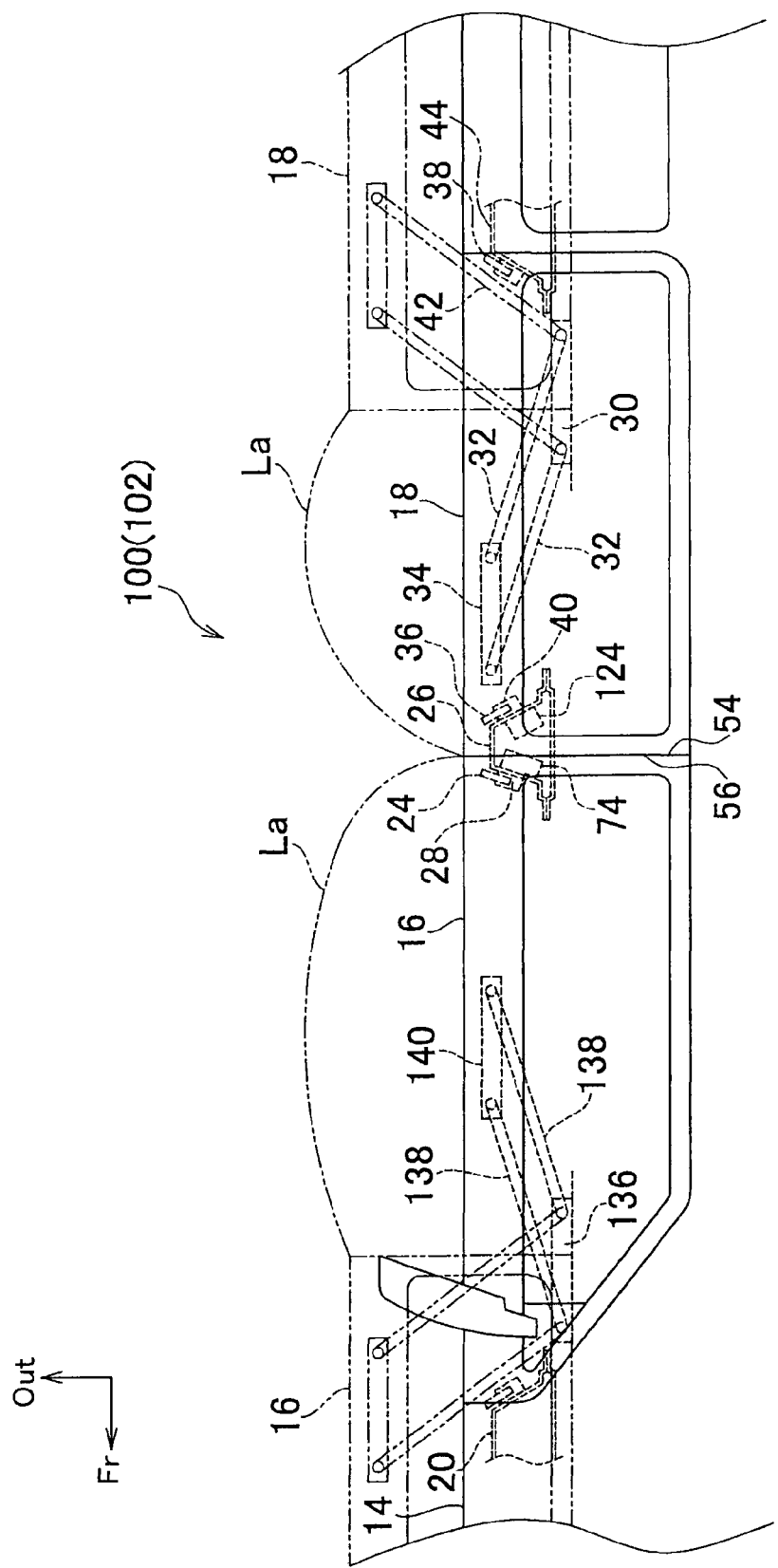
FIG. 14 is a diagram showing a modification of the vehicle door system according to the second embodiment of the present invention.
Figure 15:
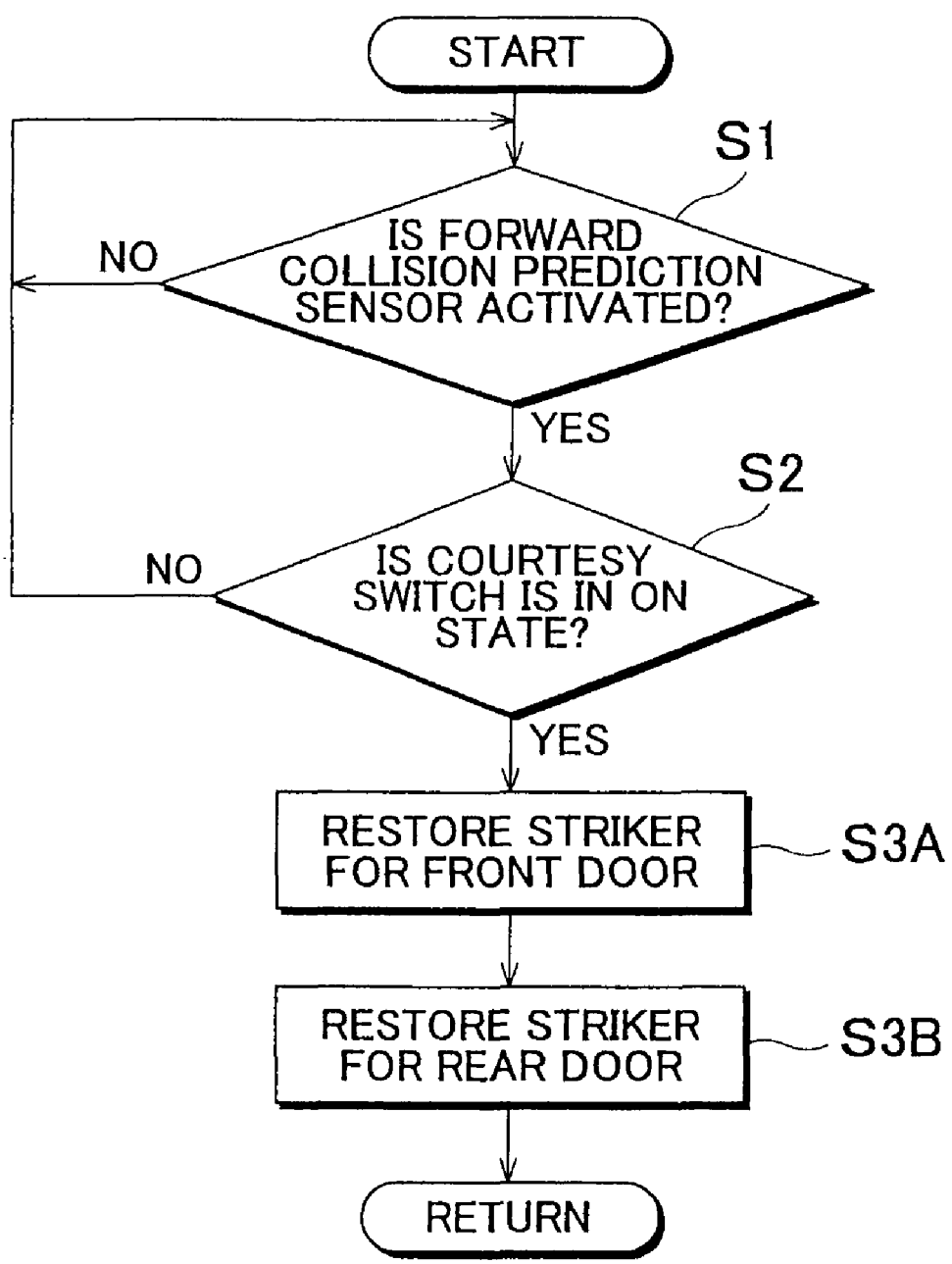
FIG. 15 is a diagram showing a modification of the vehicle door system according to the second embodiment of the present invention.

FIGS. 9 to 15 are drawings illustrating the second embodiment of the present invention. FIG. 9 is a plan view of a right side portion of a vehicle 102 in which a vehicle door system 100 is used. FIG. 10 is an important-part enlarged plan view in section of the vehicle 102. FIG. 11 is a block diagram showing an electric connection of the vehicle door system 100. FIG. 12 is a flow chart showing a control flow of the vehicle door system 100. FIGS. 13 to 15 are diagrams showing modifications of the vehicle door system 100. In these figures, the arrows Fr and Out indicate the forward direction in the longitudinal direction of the vehicle, and the outward direction in the vehicle width direction, respectively.

First, a configuration of the vehicle 102 in which the vehicle door system 100 according to the second embodiment of the present invention will be described.

The vehicle door system 100 according to the second embodiment of the present invention is one that is obtained by altering the vehicle door system 10 according to the first embodiment of the present invention described above in the following points. It should be noted that, because the components other than those described below are similar to those of the first embodiment of the present invention described above, the same reference numerals as those of the above-described first embodiment are used for the similar components, and the detailed description thereof will be omitted.

In the vehicle 102 in which the vehicle door system 100 according to the second embodiment of the present invention shown in FIG. 9 is used, a striker member 40 that is engaged with a latch member 36 provided on the front side of a rear door 18 is designed to be able to be movable in the vehicle width direction (X direction) with respect to a center pillar 26 as shown in FIG. 10. In addition, the center pillar 26 on which the striker member 40 is provided has a striker driving motor 124 within.

The striker driving motor 124 is constituted of a linear drive motor or the like, for example. The striker driving motor 124 is connected to the above-described striker member 40, and is configured to be able to move the striker member 40 in the vehicle width direction (X direction).

As shown in FIG. 10, at the peripheral portion of the rear door 18, a weather strip 122 is provided between the peripheral portion of the rear door 18 and the edge portion of a door opening 114. As shown in FIG. 10, when the rear door 18 is in a closed state, the weather strip 122 urges the entire rear door 18 outwardly in the vehicle width direction against the edge portion of the door opening 114.

As shown in FIG. 11, the vehicle door system 100 according to the second embodiment of the present invention includes a forward collision prediction sensor 76, a forward collision detection sensor 78, a courtesy switch 80, a striker driving motor 74 for the front door 16, and a control ECU 132 (Electronic Control Unit), as electric components, in addition to the above-described striker driving motor 124 for the rear door 18.

The control ECU 132 has electric circuits, including a CPU, a ROM, a RAM, etc. and is configured so as to control the striker driving motor 74 for the front door 16 and the striker driving motor 124 for the rear door 18 based on the output signals from the forward collision prediction sensor 76, the forward collision detection sensor 78, and the courtesy switch 80. Operation of the control ECU 132 will be described along with operations and effects.

Next, the operations and effects of the vehicle door system 100 according to the second embodiment of the present invention will be described along with the operation thereof, referring to the flow chart shown in FIG. 12, as needed.

In the vehicle door system 100 according to the second embodiment of the present invention, as described below, the following processes (steps S3B and S7B) are added as compared to the vehicle door system 10 according to the first embodiment of the present invention described above. With regard to the second embodiment of the present invention, the same process as that of the first embodiment of the present invention described above is denoted by the same reference characters, and the detailed description thereof will be omitted.

In the vehicle door system 100 according to the second embodiment of the present invention, when the control ECU 132 shown in FIG. 11 determines that a forward collision of the vehicle 102 is predicted in the process of step S1 (YES in step S1), and determines that the front door 16 is closed on a vehicle body side portion 14 in the process of step S2 (YES in step S2), the control ECU 132 outputs an activation signal to the striker driving motor 74 for the front door 16 shown in FIG. 10 (step S3A), and subsequently outputs an activation signal to the striker driving motor 124 for the rear door 18 (step S3B).

The striker driving motor 74 for the front door 16 is activated when receiving the activation signal from the control ECU 132, and moves a striker member 28 outwardly in the vehicle width direction as shown by the chain double-dashed line L1 in FIG. 10. Thus, the portion of the front door 16 on the terminal edge portion 54-side is pushed and displaced outwardly in the vehicle width direction as the striker member 28 moves outwardly in the vehicle width direction with a latch member 24 engaged with the striker member 28.

The striker driving motor 124 for the rear door 18 is activated when receiving the activation signal from the control ECU 132, and moves the striker member 40 inwardly in the vehicle width direction as shown by the chain double-dashed line L3 in FIG. 10. In this way, a portion of the rear door 18 at the front end thereof on the terminal edge portion 56-side is retracted inwardly in the vehicle width direction as the striker member 40 moves inwardly in the vehicle width direction with the latch member 36 engaged with the striker member 40.

When the portion of the front door 16 at the rear end thereof on the terminal edge portion 54-side is pushed and displaced outwardly in the vehicle width direction, and the portion of the front door 18 at the front end thereof on the terminal edge portion 56-side is retracted inwardly in the vehicle width direction, a state is brought about in which the terminal edge portion 54 at the rear end of the front door 16 is disposed more outwardly in the vehicle width direction than the terminal edge portion 56 at the front end of the rear door 18, as shown by the chain double-dashed lines L2 and L4 in FIG. 10. It should be noted that the driving operation of the striker driving motor 74 for the front door 16 and the striker driving motor 124 for the rear door 18 described above is performed and completed immediately after a forward collision of the vehicle 102 is predicted.

In this way, in the vehicle door system 100 according to the second embodiment of the present invention, when the forward collision prediction sensor 76 predicts a forward collision of the vehicle 102, the state of the pair of the front and rear doors 16 and 18 is immediately changed from a state (first state) where the pair of the terminal edge portions 54 and 56, with which the front and rear doors 16 and 18 are provided on respective sides, are positioned so as to face each other in the longitudinal direction of the vehicle to a state (second state) where the terminal edge portion 54 at the rear end of the front door 16 is positioned more outwardly in the vehicle width direction than the terminal edge portion 56 at the front end of the rear door 18.

When the control ECU 132 determines in the process of step S5 that a forward collision of the vehicle 102 is detected (YES in step S5), the process returns. It should be noted that the control ECU 132 may terminate the series of programmed steps in this case.

In addition, in this case, the state (second state) where the terminal edge portion 54 at the rear end of the front door 16 is positioned more outwardly in the vehicle width direction than the terminal edge portion 56 at the front end of the rear door 18 as shown by the chain double-dashed lines L2 and L4 in FIG. 10, is maintained. Thus, even when the front door 16 is moved toward the rear door 18 side (that is, toward the rear of the vehicle) due to the forward collision or the like that has occurred after the forward collision is predicted, for example, it is possible to prevent the situation in which the front door 16 is jammed inside the rear door 18, more specifically, the situation in which a rear-end hemmed portion 60 of the front door 16 gets inside a front-end hemmed portion 62 of the rear door 18 with respect to the vehicle width direction.

When the control ECU 132 determines that no forward collision of the vehicle 102 has been detected in the process of step S5 (NO in step S5), the control ECU 132 reads the count value of the timer and determines whether the count value exceeds a predetermined value, that is, whether time is up (step S6).

When the forward collision prediction sensor 76 predicts a forward collision of the vehicle 102, and the vehicle 102 then avoids the forward collision, for example, the count value of the timer exceeds a predetermined value while the control ECU 132 repeatedly performs the process from step S5 to step S6. Accordingly, in this case, the control ECU 132 determines that time is up (YES in step S6).

Subsequently, the control ECU 132 outputs a restoration signal to the striker driving motor 74 for the front door 16 (step S7A), and subsequently, outputs a restoration signal to the striker driving motor 124 for the rear door 18 (step S7B).

When receiving the restoration signal from the control ECU 132, the striker driving motor 74 effectuates inverse driving to move the striker member 28 from the position indicated by the chain double-dashed line L2 in FIG. 10 inwardly in the vehicle width direction. Thus, the latch member 24 is retracted inwardly in the vehicle width direction by the striker member 28, which brings about a state where the front door 16 is closed on the vehicle body side portion 14.

When receiving the restoration signal from the control ECU 132, the striker driving motor 124 for the rear door 18 effectuates inverse driving to move the striker member 40 from the position indicated by the chain double-dashed line L4 in FIG. 10 outwardly in the vehicle width direction. At this time, a front end portion 122A of the weather strip 122 urges the portion of the rear door 18 on the terminal edge portion 56-side outwardly in the vehicle width direction along the terminal edge portion 56. Accordingly, the portion of the rear door 18 on the terminal edge portion 56-side is pushed and displaced outwardly in the vehicle width direction as the striker member 40 moves outwardly in the vehicle width direction with the latch member 36 engaged with the striker member 40.

Under ordinary conditions where the forward collision or the like is not occurring, the pair of the terminal edge portions 54 and 56, with which the front and rear doors 16 and 18 are provided on respective sides, are positioned so as to face each other in the longitudinal direction of the vehicle.

In this way, with the vehicle door system 100 according to the second embodiment of the present invention, when the forward collision prediction sensor 76 predicts a forward collision of the vehicle, and the vehicle 102 then avoids the forward collision, for example, the state of the pair of the front and rear doors 16 and 18 is restored from the state (second state) where the terminal edge portion 54 of the front door 16 is positioned more outwardly in the vehicle width direction than the terminal edge portion 56 of the rear door 18, to the state (first state) where the pair of the terminal edge portions 54 and 56 are positioned so as to face each other in the longitudinal direction of the vehicle. In this state, the space between the terminal edge portion 54 of the front door 16 and the terminal edge portion 56 of the rear door 18 is narrowed, whereby good appearance of the front and rear doors 16 and 18 is obtained.

As described above in detail, with the vehicle door system 100 according to the second embodiment of the present invention, when the forward collision prediction sensor 76 predicts a forward collision of the vehicle 102, the state of the pair of the front and rear doors 16 and 18 is immediately changed to the state (second state) where the terminal edge portion 54 at the rear end of the front door 16 is positioned more outwardly in the vehicle width direction than the terminal edge portion 56 at the front end of the rear door 18. Thus, even when the front door 16 moves toward the rear door 18 side (that is, toward the rear of the vehicle) due to the forward collision or the like that has occurred after the forward collision is predicted, it is possible to prevent the situation in which the front door 16 is jammed inside the rear door 18, more specifically, the situation in which the rear-end hemmed portion 60 of the front door 16 gets inside the front-end hemmed portion 62 of the rear door 18 with respect to the vehicle width direction. In this way, it is possible to ensure the opening operation of the front door 16 with no interference from the rear door 18.

With the vehicle door system 100 according to the second embodiment of the present invention, when a forward collision of the vehicle 102 is predicted, the portion of the front door 16 at the rear end thereof on the terminal edge portion 54-side is pushed and displaced outwardly in the vehicle width direction, and at the same time, the portion of the rear door 18 at the front end thereof on the terminal edge portion 56-side is retracted inwardly in the vehicle width direction. Thus, it is possible to secure a greater separation distance between the terminal edge portion 54 at the rear end of the front door 16 and the terminal edge portion 56 at the front end of the rear door 18 in the vehicle width direction. In this way, it is possible to prevent the situation in which the rear-end hemmed portion 60 of the front door 16 gets inside the front-end hemmed portion 62 of the rear door 18 with respect to the vehicle width direction.

According to the vehicle door system 100 according to the second embodiment of the present invention, the rear door 18 is configured as a link-arm type slide door that slides with a link arm 32 swinging. The trajectory La of the sliding movement of the terminal edge portion of the link-arm type slide door lies along the vehicle width direction near the position at which the door is completely closed. Accordingly, it is possible to retract the portion of the rear door 18 at the front end thereof on the terminal edge portion 56-side as the striker member 40 moves inwardly in the vehicle width direction as described above owing to the door trajectory characteristic of the link-arm type slide door.

Once a forward collision or the like of the vehicle 102 occurs, for example, it is possible to position the terminal edge portion 54 of the front door 16 more outwardly in the vehicle width direction than the terminal edge portion 56 of the rear door 18 by retracting the portion of the rear door 18 at the front end thereof on the terminal edge portion 56-side inwardly in the vehicle width direction as the striker member 40 moves inwardly in the vehicle width direction as described above.

According to the vehicle door system 100 according to the second embodiment of the present invention, when the forward collision prediction sensor 76 predicts a forward collision of the vehicle 102, and the vehicle 102 then avoids the forward collision, for example, the state of the pair of the front and rear doors 16 and 18 is restored from the state (second state) where the terminal edge portion 54 of the front door 16 is positioned more outwardly in the vehicle width direction than the terminal edge portion 56 of the rear door 18, to the state (first state) where the pair of the terminal edge portions 54 and 56 are positioned so as to face each other in the longitudinal direction of the vehicle. Thus, it is possible to prevent the situation in which the terminal edge portion 54 of the front door 16 is left positioned more outwardly in the vehicle width direction than the terminal edge portion 56 of the rear door 18 in spite of the fact that no forward collision or the like of the vehicle 102 is occurring.

Next, a modification of the vehicle door system 100 according to the second embodiment of the present invention will be described.

In the above embodiment, the rear door 18 is configured as a link-arm type slide door that slides with the link arm 32 swinging. However, as shown in FIG. 13, the rear door 18 may be configured as a hinged swing door that is connected to the rear pillar 44 through a door hinge 134 on the rear end side of the door, and that pivots relative to the vehicle body side portion 14.

In addition, the vehicle door system 100 may be configured so that, when a forward collision of the vehicle 102 is predicted, the portion of the front door 16 at the rear end thereof on the terminal edge portion 54-side is pushed and displaced outwardly in the vehicle width direction, and at the same time, the portion of the rear door 18 at the front end on the terminal edge portion 56-side is retracted inwardly in the vehicle width direction, whereby the state of the pair of the front and rear doors 16 and 18 is changed to the state (second state; see FIG. 10) where the terminal edge portion 54 at the rear end of the front door 16 is positioned more outwardly in the vehicle width direction than the terminal edge portion 56 at the front end of the rear door 18.

As described above, the trajectory Lb of the swinging movement of the terminal edge portion of the hinged swing door lies along the vehicle width direction near the position at which the door is completely closed. Accordingly, owing to the door trajectory characteristic of the link-arm type slide door, even when the rear door 18 is configured as a hinged swing door whose open end is on the front end side, it is possible to retract the portion of the rear door 18 at the front end thereof on the terminal edge portion 56-side inwardly in the vehicle width direction as the striker member 40 moves inwardly in the vehicle width direction.

In the above embodiment, the front door 16 is configured as a hinged swing door that pivots relative to the vehicle body side portion 14. However, as shown in FIG. 14, the front door 16 may be configured as a link-arm type slide door in which a link arm 138, one end of which is freely pivotally connected to the vehicle body side portion 14 through a hinge base 136, is freely pivotally connected to the front door 16 with a door hinge 140 on the other end side, and that slides with the link arm 138 swinging.

On top of that, the vehicle door system 100 may be configured so that, when a forward collision of the vehicle 102 is predicted, the portion of the front door 16 at the rear end thereof on the terminal edge portion 54-side is pushed and displaced outwardly in the vehicle width direction, and at the same time, the portion of the rear door 18 at the front end thereof on the terminal edge portion 56-side is retracted inwardly in the vehicle width direction, whereby the state of the pair of the front and rear doors 16 and 18 is changed to the state (second state; see FIG. 10) where the terminal edge portion 54 at the rear end of the front door 16 is positioned more outwardly in the vehicle width direction than the terminal edge portion 56 at the front end of the rear door 18.

As described above, the trajectory La of the sliding movement of the terminal edge portion of the link-arm type slide door lies along the vehicle width direction near the position at which the door is completely closed. Accordingly, owing to the door trajectory characteristic of the link-arm type slide door, even when the front door 16 is configured as a link-arm type slide door, it is possible to push and displace the portion of the front door 16 at the rear end thereof on the terminal edge portion 54-side outwardly in the vehicle width direction as the striker member 28 moves outwardly in the vehicle width direction.

In the above embodiment, the control ECU 132 is configured so as to start the timer and perform detection of the output signal from the forward collision detection sensor 78 after outputting the activation signal to the striker driving motor 124 in the process of step S3B. However, the control ECU 132 may be configured so that the process returns after the control ECU 132 outputs the activation signal to the striker driving motor 124 in the process of step S3B, as shown in FIG. 15.

In the second embodiment of the present invention, the door locks of the front and rear doors 16 and 18 may be constructed similarly to the door lock 66 shown in connection with the modification (see FIGS. 8A and 8B) of the first embodiment described above, for example.

Third Embodiment

A third embodiment of the present invention will be described below with reference to FIGS. 16 to 22.

Figure 16:
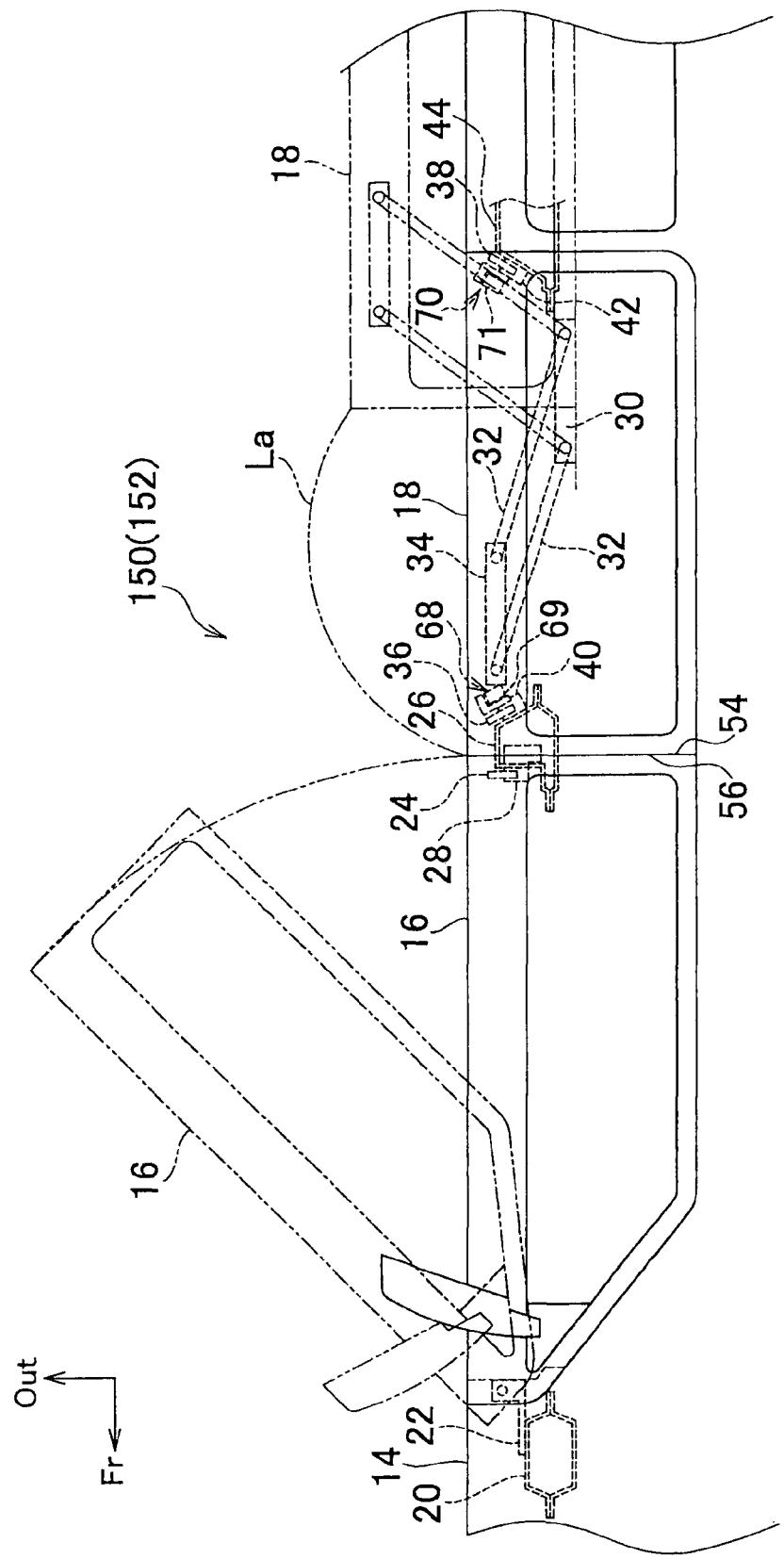
FIG. 16 is a plan view of a right side portion of a vehicle in which a vehicle door system according to a third embodiment of the present invention is used.
Figure 17:
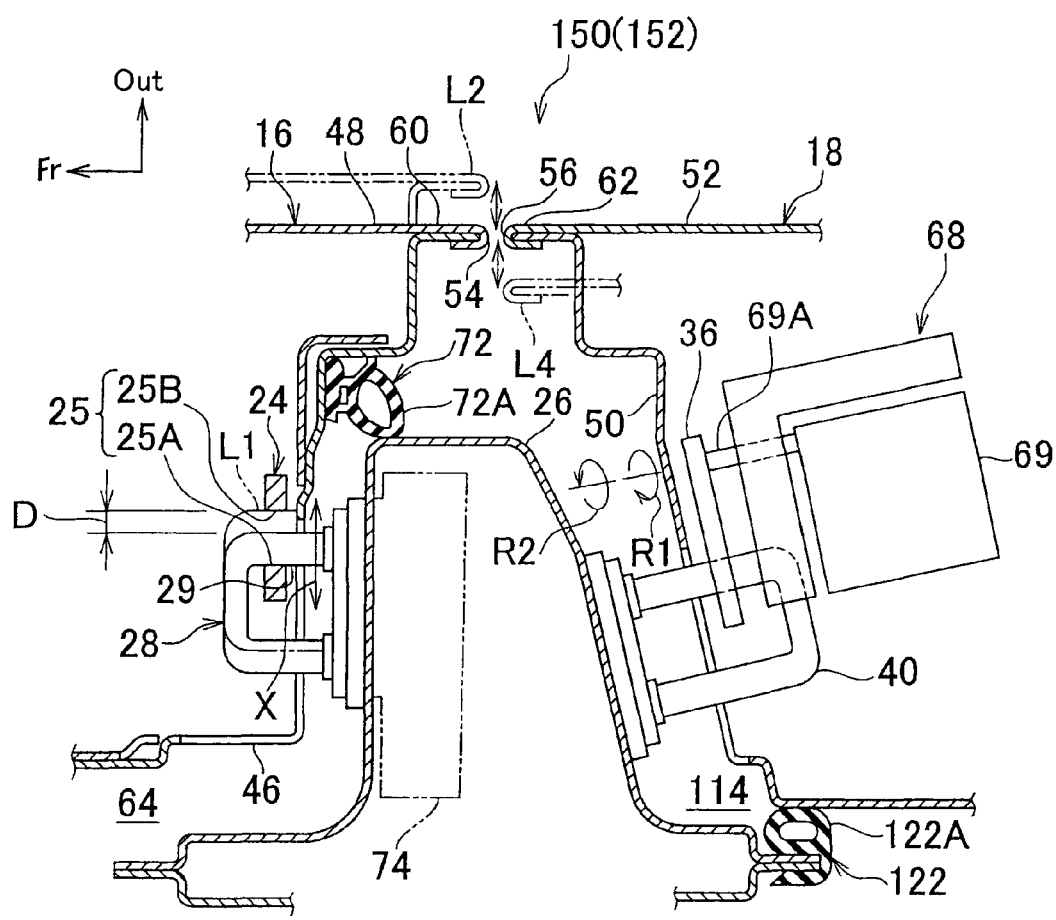
FIG. 17 is an important-part enlarged plan view in section of the vehicle in which the vehicle door system according to the third embodiment of the present invention is used.
Figure 18A:
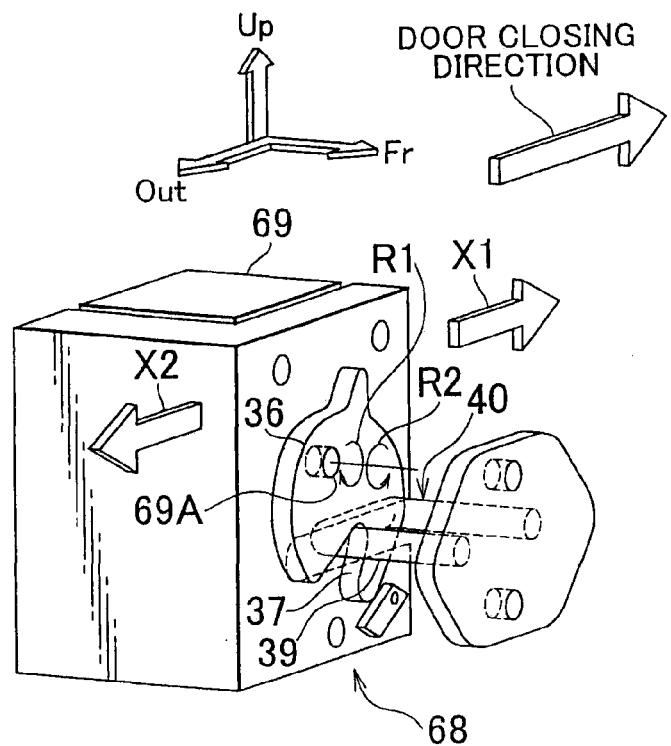
FIGS. 18A and 18B are perspective views showing a construction of a door lock provided in the vehicle door system according to the third embodiment of the present invention.
Figure 18B:
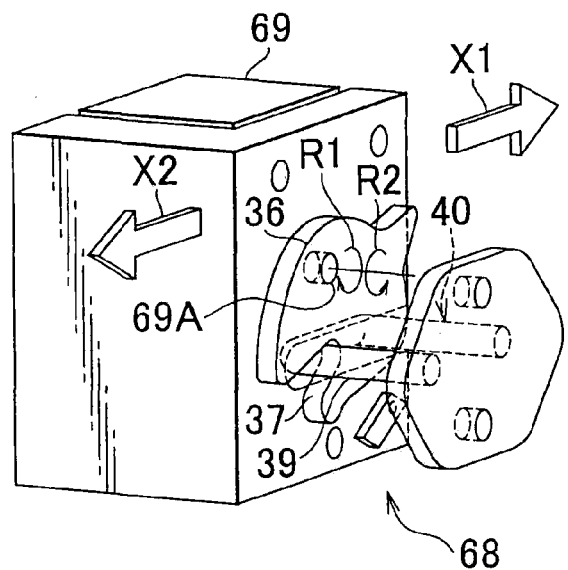
Figure 19:
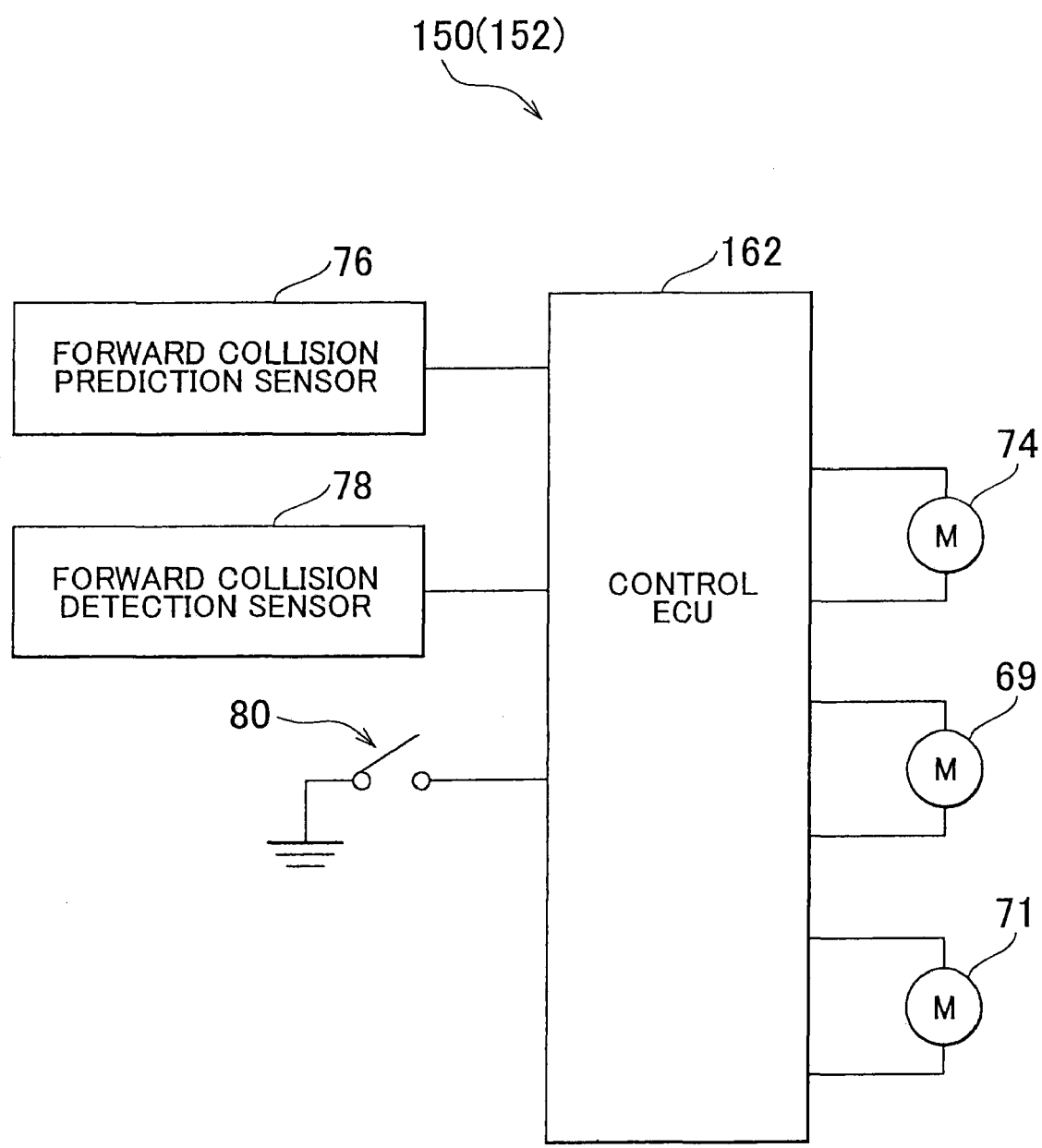
FIG. 19 is a block diagram showing an electric connection of the vehicle door system according to the third embodiment of the present invention.
Figure 20:
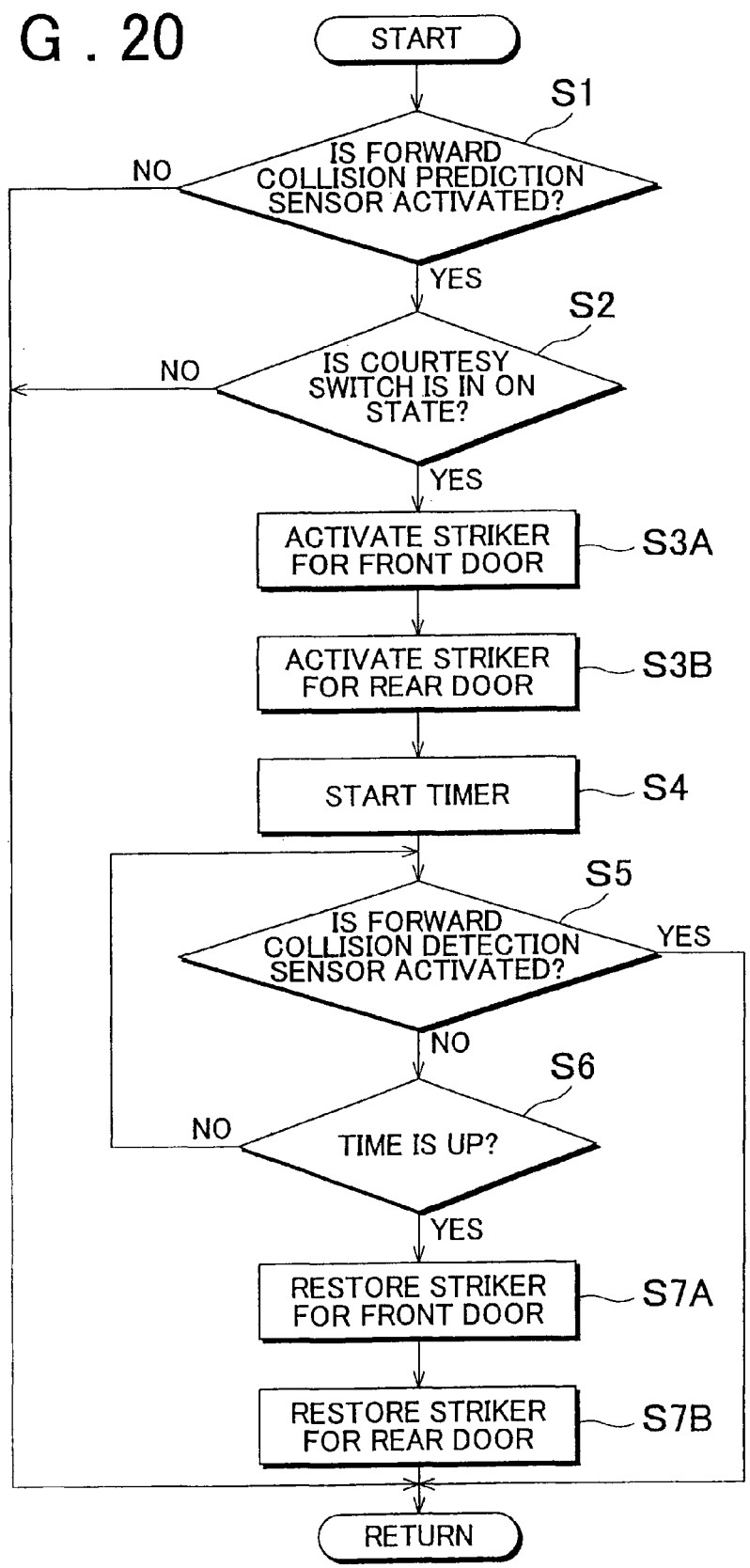
FIG. 20 is a flow chart showing a control flow of the vehicle door system according to the third embodiment of the present invention.
Figure 21:
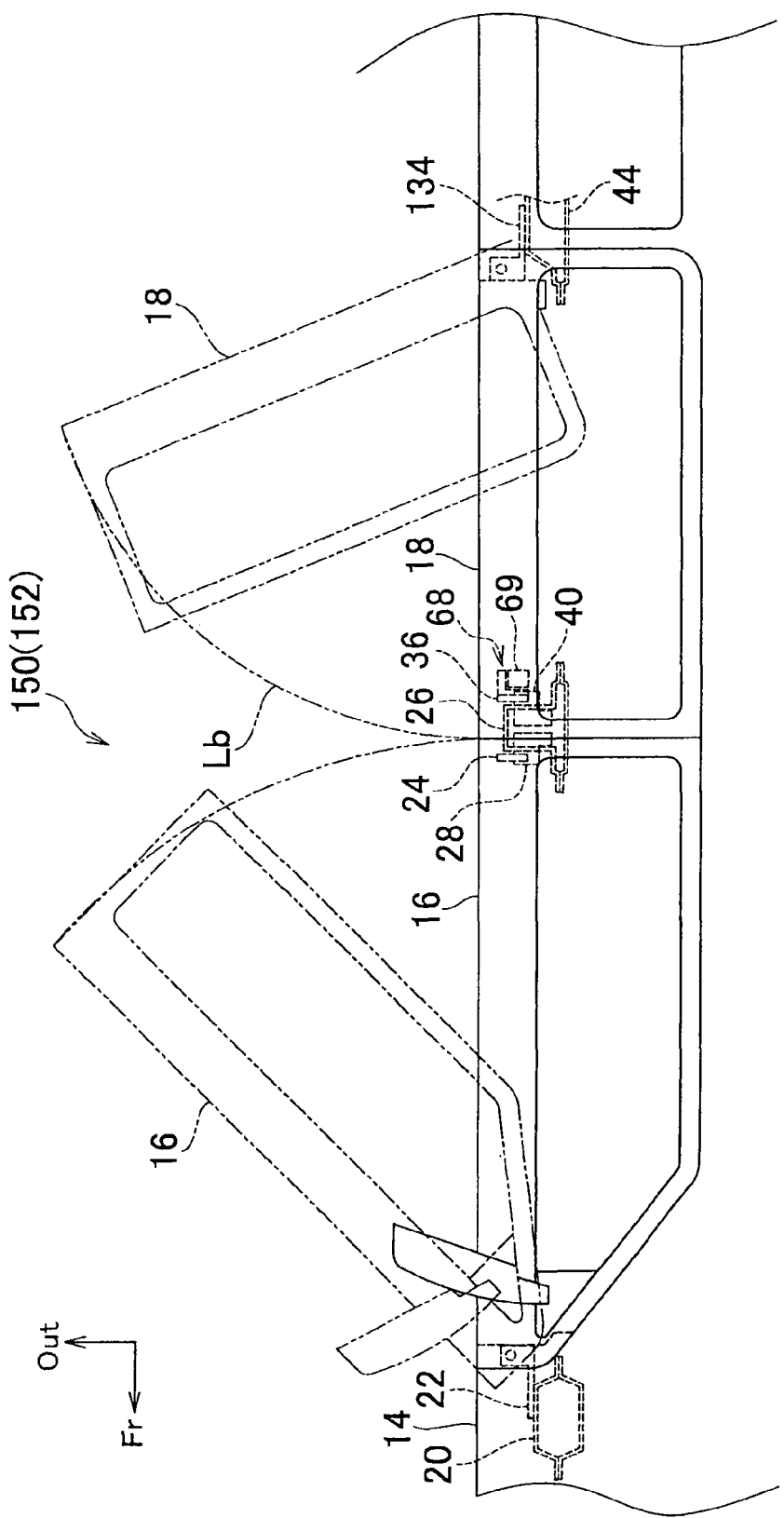
FIG. 21 is a diagram showing a modification of the vehicle door system according to the third embodiment of the present invention.
Figure 22:
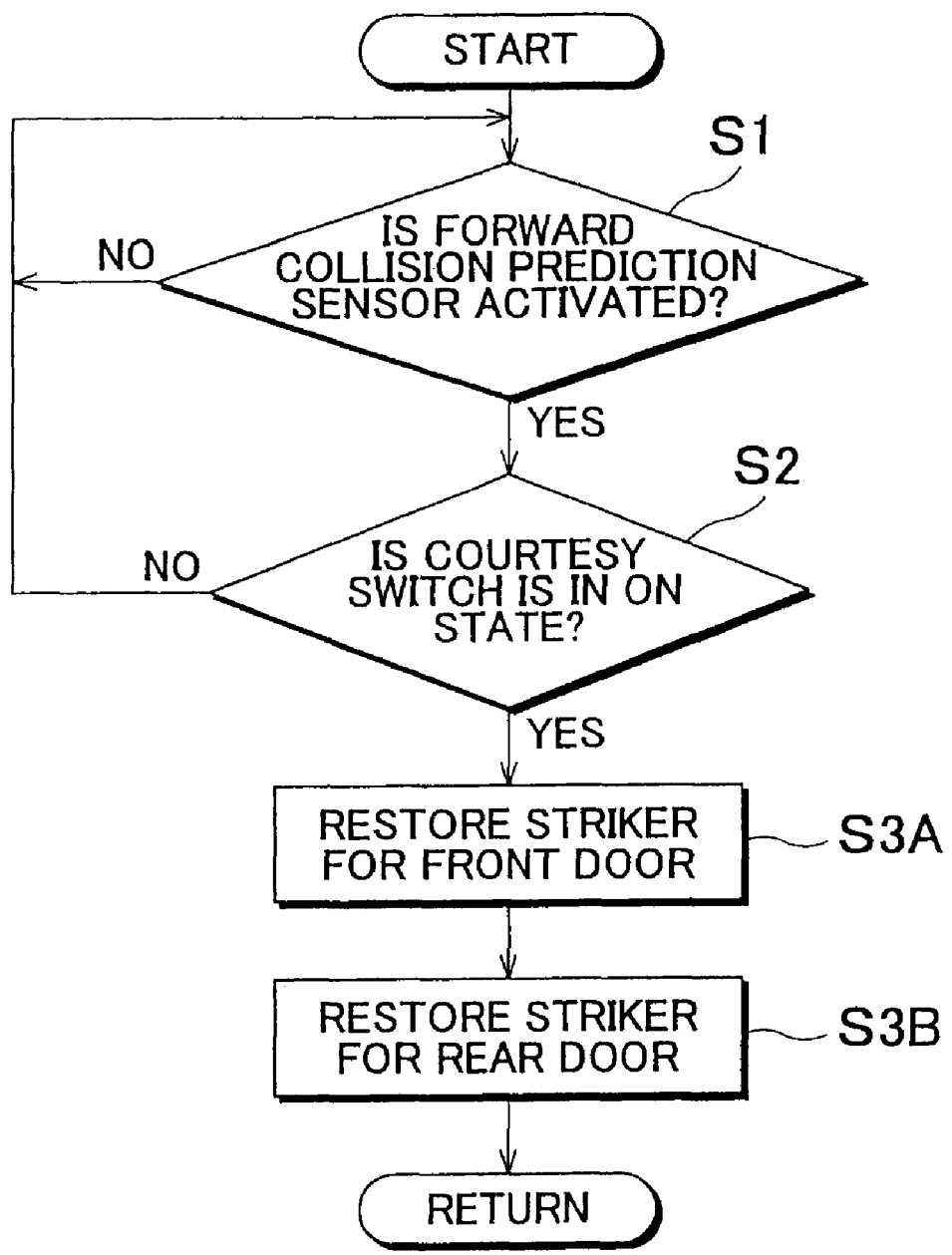
FIG. 22 is a diagram showing a modification of the vehicle door system according to the third embodiment of the present invention.

FIGS. 16 to 22 are drawings illustrating the third embodiment of the present invention. FIG. 16 is a plan view of a right side portion of a vehicle 152 in which a vehicle door system 150 is used. FIG. 17 is an important-part enlarged plan view in section of the vehicle 152. FIGS. 18A and 18B are perspective views showing a construction of a door lock 68 provided in the vehicle door system 150. FIG. 19 is a block diagram showing an electric connection of the vehicle door system 150. FIG. 20 is a flow chart showing a control flow of the vehicle door system 150. FIGS. 21 and 22 are diagrams showing a modification of the vehicle door system 150. In these figures, the arrows Up, Fr and Out indicate the upward direction in the vertical direction of the vehicle, the forward direction in the longitudinal direction of the vehicle, and the outward direction in the vehicle width direction, respectively.

First, a configuration of the vehicle 152 in which the vehicle door system 150 according to the third embodiment of the present invention will be described.

The vehicle door system 150 according to the third embodiment of the present invention is one that is obtained by changing the vehicle door system 100 according to the second embodiment of the present invention described above in the following points. It should be noted that, because the components other than those described below are similar to those of the second embodiment of the present invention described above, the same reference numerals as those of the above-described second embodiment are used for the similar components, and the detailed description thereof will be omitted.

In the vehicle 152 in which the vehicle door system 150 according to the third embodiment of the present invention shown in FIG. 16 is used, a front-side striker member 40 for a rear door 18 is fixed to a center pillar 26. In addition, the rear door 18 is provided with a door lock 68 on the front end side, as shown in FIG. 17.

The door lock 68 includes a latch member 36 and a closer motor 69. As shown in FIGS. 18A and 18B, the latch member 36 is configured to have a substantially U shape when viewed from the front, including a concave, counterpart engagement portion 37 that is engaged with a rod-like engagement portion 39 of the striker member 40. The latch member 36 is connected to an output shaft 69A of the closer motor 69. The counterpart engagement portion 37 is located radially apart from the output shaft 69A that serves as the rotation shaft of the latch member 36. When the latch member 36 pivots using the output shaft 69A as the rotation shaft, the counterpart engagement portion 37 is moved in the vehicle width direction.

The closer motor 69 is configured so as to be able to rotate the output shaft 69A, and is configured so as to be able to cause the above-described latch member 36 to pivot in two directions by rotating the output shaft 69A.

As shown in FIG. 17, at the peripheral portion of the rear door 18, a weather strip 122 is provided between the peripheral portion of the rear door 18 and the edge portion of a door opening 114. As shown in FIG. 17, when the rear door 18 is in a closed state, the weather strip 122 urges the entire rear door 18 outwardly in the vehicle width direction against the edge portion of the door opening 114.

As shown in FIG. 19, the vehicle door system 150 according to the third embodiment of the present invention includes a forward collision prediction sensor 76, a forward collision detection sensor 78, a courtesy switch 80, a striker driving motor 74 for a front door 16, a closer motor 71 for the rear door lock of the rear door 18, and a control ECU 162 (Electronic Control Unit), as electric components, in addition to the above-described closer motor 69 for the front door lock of the rear door 18.

The control ECU 162 has electric circuits, including a CPU, a ROM, a RAM, etc. and is configured so as to control the striker driving motor 74 for the front door 16 and the closer motor 69 for the rear door 18 based on the output signals from the forward collision prediction sensor 76, the forward collision detection sensor 78, and the courtesy switch 80. Operation of the control ECU 162 will be described along with operations and effects.

Next, the operations and effects of the vehicle door system 150 according to the third embodiment of the present invention will be described along with the operation thereof, referring to the flow chart shown in FIG. 20, as needed.

In the vehicle door system 150 according to the third embodiment of the present invention, as described below, the following processes (steps S3B and S7B) are altered as compared to the vehicle door system 100 according to the second embodiment of the present invention described above. With regard to the third embodiment of the present invention, the same process as that of the second embodiment of the present invention described above is denoted by the same reference characters, and the detailed description thereof will be omitted.

In the vehicle door system 150 according to the third embodiment of the present invention, when the control ECU 162 shown in FIG. 19 determines that a forward collision of the vehicle 152 is predicted in the process of step S1 (YES in step S1), and determines that the front door 16 is closed on a vehicle body side portion 14 in the process of step S2 (YES in step S2), the control ECU 162 outputs an activation signal to the striker driving motor 74 for the front door 16 shown in FIG. 17 (step S3A), and subsequently outputs an activation signal to the closer motor 69 for the rear door 18 (step S3B).

The striker driving motor 74 for the front door 16 is activated when receiving the activation signal from the control ECU 162, and moves a striker member 28 outwardly in the vehicle width direction as shown by the chain double-dashed line L2 in FIG. 17. Thus, the portion of the front door 16 on the terminal edge portion 54-side is pushed and displaced outwardly in the vehicle width direction as the striker member 28 moves outwardly in the vehicle width direction with a latch member 24 engaged with the striker member 28.

When receiving the activation signal from the control ECU 162, the closer motor 69 for the rear door 18 is activated, and rotates the latch member 36 in the direction R1 (the direction such that a counterpart engagement portion 37 is moved outwardly in the vehicle width direction when viewed from the top) as shown in FIG. 18A. Rotation of the latch member 36 with the latch member 36 engaged with the striker member 40 causes the counterpart engagement portion 37 to apply a force to the striker member 40 in the direction X2 when viewed from the top as shown in FIG. 18B, and the reaction force to this force causes the portion of the rear door 18, shown in FIG. 16, at the front end thereof on the terminal edge portion 56-side is retracted inwardly in the vehicle width direction.

When the portion of the front door 16 at the rear end thereof on the terminal edge portion 54-side is pushed and displaced outwardly in the vehicle width direction, and the portion of the front door 18 at the front end thereof on the terminal edge portion 56-side is retracted inwardly in the vehicle width direction, a state is brought about in which the terminal edge portion 54 at the rear end of the front door 16 is disposed more outwardly in the vehicle width direction than the terminal edge portion 56 at the front end of the rear door 18, as shown by the chain double-dashed lines L2 and L4 in FIG. 17. It should be noted that the driving operation of the striker driving motor 74 for the front door 16 and the closer motor 69 for the rear door 18 described above is performed and completed immediately after a forward collision of the vehicle 152 is predicted.

In this way, in the vehicle door system 150 according to the third embodiment of the present invention, when the forward collision prediction sensor 76 predicts a forward collision of the vehicle 152, the state of the pair of the front and rear doors 16 and 18 is immediately changed from a state (first state) where the pair of the terminal edge portions 54 and 56, with which the front and rear doors 16 and 18 are provided on respective sides, are positioned so as to face each other in the longitudinal direction of the vehicle to a state (second state) where the terminal edge portion 54 at the rear end of the front door 16 is positioned more outwardly in the vehicle width direction than the terminal edge portion 56 at the front end of the rear door 18.

When the control ECU 162 determines in the process of step S5 that a forward collision of the vehicle 152 is detected (YES in step S5), the process returns. It should be noted that the control ECU 162 may terminate the series of programmed steps in this case.

In addition, in this case, the state (second state) where the terminal edge portion 54 at the rear end of the front door 16 is positioned more outwardly in the vehicle width direction than the terminal edge portion 56 at the front end of the rear door 18 as shown by the chain double-dashed lines L2 and L4 in FIG. 17, is maintained. Thus, even when the front door 16 moves toward the rear door 18 side (that is, toward the rear of the vehicle) due to the forward collision or the like that has occurred after the forward collision is predicted, for example, it is possible to prevent the situation in which the front door 16 is jammed inside the rear door 18, more specifically, the situation in which a rear-end hemmed portion 60 of the front door 16 gets inside a front-end hemmed portion 62 of the rear door 18 with respect to the vehicle width direction.

When the control ECU 162 determines that no forward collision of the vehicle 152 has been detected in the process of step S5 (NO in step S5), the control ECU 162 reads the count value of the timer and determines whether the count value exceeds a predetermined value, that is, whether time is up (step S6).

When the forward collision prediction sensor 76 predicts a forward collision of the vehicle 152, and the vehicle 152 then avoids the forward collision, for example, the count value of the timer exceeds a predetermined value while the control ECU 162 repeatedly performs the process from step S5 to step S6. Accordingly, in this case, the control ECU 162 determines that time is up (YES in step S6).

Subsequently, the control ECU 162 outputs a restoration signal to the striker driving motor 74 for the front door 16 (step S7A), and subsequently, outputs a restoration signal to the closer motor 69 for the front door 18 (step S7B).

When receiving the restoration signal from the control ECU 162, the striker driving motor 74 effectuates inverse driving to move the striker member 28 from the position indicated by the chain double-dashed line L1 in FIG. 17 inwardly in the vehicle width direction. Thus, the latch member 24 is retracted inwardly in the vehicle width direction by the striker member 28, which brings about a state where the front door 16 is closed on the vehicle body side portion 14.

When receiving the restoration signal from the control ECU 162, the closer motor 69 for the rear door 18 effectuates inverse driving to rotate the latch member 36 in the direction R2 (the direction such that a counterpart engagement portion 37 is moved inwardly in the vehicle width direction when viewed from the top) as shown in FIG. 18B. Rotation of the latch member 36 with the latch member 36 engaged with the striker member 40 causes the counterpart engagement portion 37 to move inwardly in the vehicle width direction (in the direction X1) when viewed from the top as shown in FIG. 18A. At this time, a front end portion 122A of the weather strip 122 shown in FIG. 17 urges the portion of the rear door 18 on the terminal edge portion 56-side outwardly in the vehicle width direction along the terminal edge portion 56. Thus, the portion of the rear door 18 at the front end thereof on the terminal edge portion 56-side is pushed and displaced outwardly in the vehicle width direction.

Under ordinary conditions where the forward collision or the like is not occurring, the pair of the terminal edge portions 54 and 56, with which the front and rear doors 16 and 18 are provided on respective sides, are positioned so as to face each other in the longitudinal direction of the vehicle.

In this way, with the vehicle door system 150 according to the third embodiment of the present invention, when the forward collision prediction sensor 76 predicts a forward collision of the vehicle 152, and the vehicle 152 then avoids the forward collision, for example, the state of the pair of the front and rear doors 16 and 18 is restored from the state (second state) where the terminal edge portion 54 of the front door 16 is positioned more outwardly in the vehicle width direction than the terminal edge portion 56 of the rear door 18, to the state (first state) where the pair of the terminal edge portions 54 and 56 are positioned so as to face each other in the longitudinal direction of the vehicle. In this state, the space between the terminal edge portion 54 of the front door 16 and the terminal edge portion 56 of the rear door 18 is narrowed, whereby good appearance of the front and rear doors 16 and 18 is obtained.

As described above in detail, with the vehicle door system 150 according to the third embodiment of the present invention, when the forward collision prediction sensor 76 predicts a forward collision of the vehicle 152, the state of the pair of the front and rear doors 16 and 18 is immediately changed to the state (second state) where the terminal edge portion 54 at the rear end of the front door 16 is positioned more outwardly in the vehicle width direction than the terminal edge portion 56 at the front end of the rear door 18. Thus, even when the front door 16 moves toward the rear door 18 side (that is, toward the rear of the vehicle) due to the forward collision or the like that has occurred after the forward collision is predicted, it is possible to prevent the situation in which the front door 16 is jammed inside the rear door 18, more specifically, the situation in which the rear-end hemmed portion 60 of the front door 16 gets inside the front-end hemmed portion 62 of the rear door 18 with respect to the vehicle width direction. In this way, it is possible to ensure the opening operation of the front door 16 with no interference from the rear door 18.

With the vehicle door system 150 according to the third embodiment of the present invention, when a forward collision of the vehicle 152 is predicted, the portion of the front door 16 at the rear end thereof on the terminal edge portion 54-side is pushed and displaced outwardly in the vehicle width direction, and at the same time, the portion of the rear door 18 at the front end thereof on the terminal edge portion 56-side is retracted inwardly in the vehicle width direction. Thus, it is possible to secure a greater separation distance between the terminal edge portion 54 at the rear end of the front door 16 and the terminal edge portion 56 at the front end of the rear door 18 in the vehicle width direction. In this way, it is possible to prevent the situation in which the rear-end hemmed portion 60 of the front door 16 gets inside the front-end hemmed portion 62 of the rear door 18 with respect to the vehicle width direction.

According to the vehicle door system 150 according to the third embodiment of the present invention, the rear door 18 is configured as a link-arm type slide door that slides with a link arm 32 swinging. The trajectory La of the sliding movement of the terminal edge portion of the link-arm type slide door lies along the vehicle width direction near the position at which the door is completely closed. Accordingly, it is possible to retract the portion of the rear door 18 at the front end thereof on the terminal edge portion 56-side as the latch member 36 rotates as described above owing to the door trajectory characteristic of the link-arm type slide door.

Once a forward collision or the like of the vehicle 152 occurs, for example, it is possible to position the terminal edge portion 54 of the front door 16 more outwardly in the vehicle width direction than the terminal edge portion 56 of the rear door 18 by retracting the portion of the rear door 18 at the front end thereof on the terminal edge portion 56-side inwardly in the vehicle width direction as the latch member 36 rotates as described above.

According to the vehicle door system 150 according to the third embodiment of the present invention, when the forward collision prediction sensor 76 predicts a forward collision of the vehicle 152, and the vehicle 152 then avoids the forward collision, for example, the state of the pair of the front and rear doors 16 and 18 is restored from the state (second state) where the terminal edge portion 54 of the front door 16 is positioned more outwardly in the vehicle width direction than the terminal edge portion 56 of the rear door 18, to the state (first state) where the pair of the terminal edge portions 54 and 56 are positioned so as to face each other in the longitudinal direction of the vehicle. Thus, it is possible to prevent the situation in which the terminal edge portion 54 of the front door 16 is left positioned more outwardly in the vehicle width direction than the terminal edge portion 56 of the rear door 18 in spite of the fact that no forward collision or the like of the vehicle 152 is occurring.

Next, a modification of the vehicle door system 150 according to the third embodiment of the present invention will be described.

In the above embodiment, the rear door 18 is configured as a link-arm type slide door that slides with the link arm 32 swinging. However, as shown in FIG. 21, the rear door 18 may be configured as a hinged swing door that is connected to the rear pillar 44 through a door hinge 134 on the rear end side of the door, and that pivots relative to the vehicle body side portion 14.

In addition, the vehicle door system 150 may be configured so that, when a forward collision of the vehicle 152 is predicted, the portion of the front door 16 at the rear end thereof on the terminal edge portion 54-side is pushed and displaced outwardly in the vehicle width direction, and at the same time, the portion of the rear door 18 at the front end on the terminal edge portion 56-side is retracted inwardly in the vehicle width direction, whereby the state of the pair of the front and rear doors 16 and 18 is changed to the state (second state; see FIG. 17) where the terminal edge portion 54 at the rear end of the front door 16 is positioned more outwardly in the vehicle width direction than the terminal edge portion 56 at the front end of the rear door 18.

As described above, the trajectory Lb of the sliding movement of the terminal edge portion of the hinged swing door lies along the vehicle width direction near the position at which the door is completely closed. Accordingly, owing to the door trajectory characteristic of the link-arm type slide door, even when the rear door 18 is configured as a hinged swing door whose open end is on the front end side, it is possible to retract the portion of the rear door 18 at the front end thereof on the terminal edge portion 56-side inwardly in the vehicle width direction as the latch member 36 rotates.

In the above embodiment, the front door 16 is configured as a hinged swing door that pivots relative to the vehicle body side portion 14. However, the front door 16 may be configured as a link-arm type slide door in which a link arm 138, one end of which is freely pivotally connected to the vehicle body side portion 14 through a hinge base 136, is freely pivotally connected to the front door 16 with a door hinge 140 on the other end side, and the link-arm type slide door slides with the link arm 138 swinging (see FIG. 14).

In the above embodiment, the control ECU 162 is configured so as to start the timer and perform detection of the output signal from the forward collision detection sensor 78 after outputting the activation signal to the closer motor 69 in the process of step S3B. However, the control ECU 162 may be configured so that the process returns after the control ECU 162 outputs the activation signal to the closer motor 69 in the step of S3B, as shown in FIG. 22.

In the third embodiment of the present invention, the door locks of the front and rear doors 16 and 18 may be constructed similarly to the door lock 66 shown in connection with the modification (see FIGS. 8A and 8B) of the first embodiment described above, for example.

Fourth Embodiment

A fourth embodiment of the present invention will be described below with reference to FIGS. 23 to 25.

Figure 23:
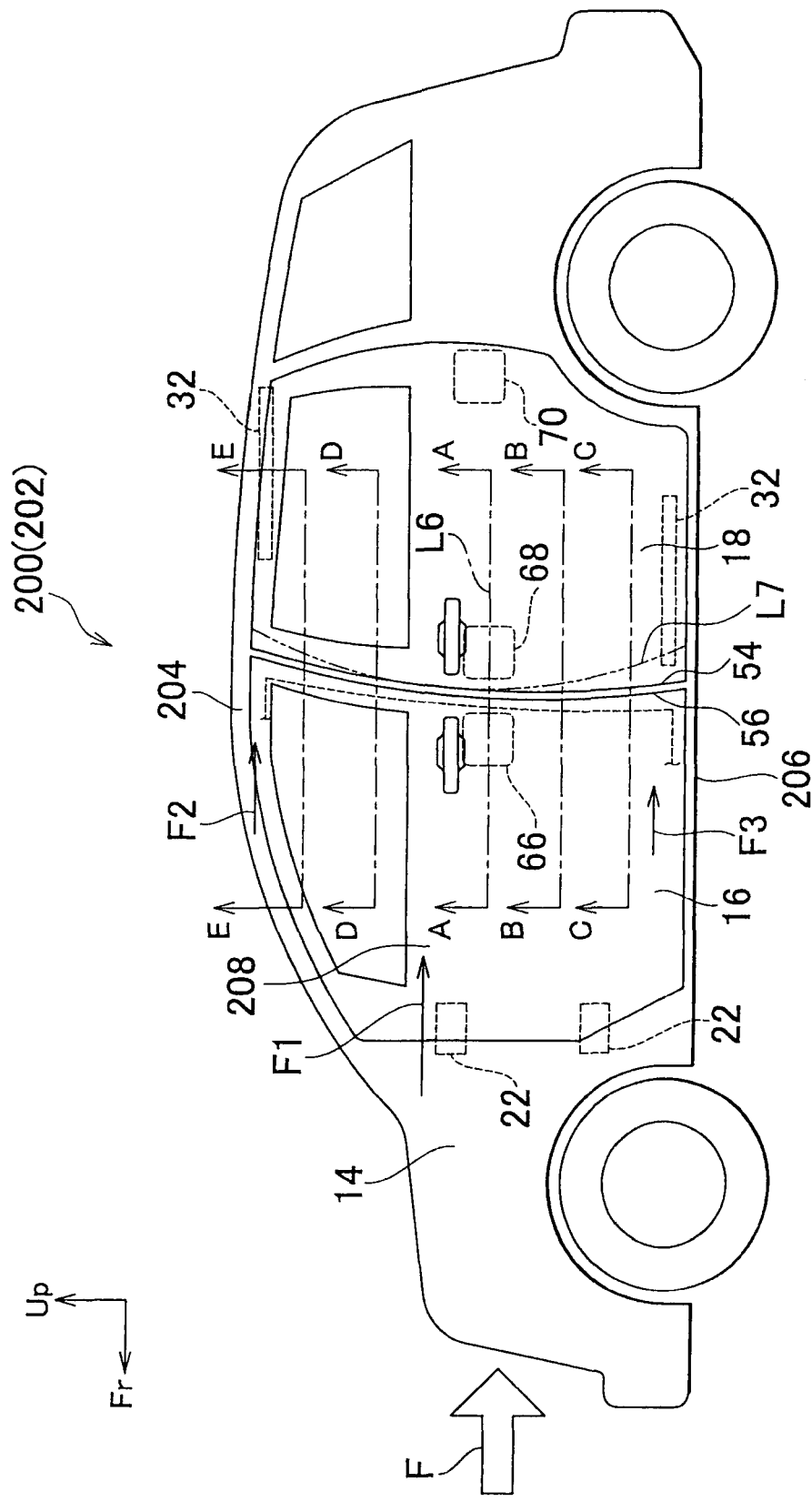
FIG. 23 is a left side view of a vehicle in which a vehicle door system according to a fourth embodiment of the present invention is used.
Figure 24A:
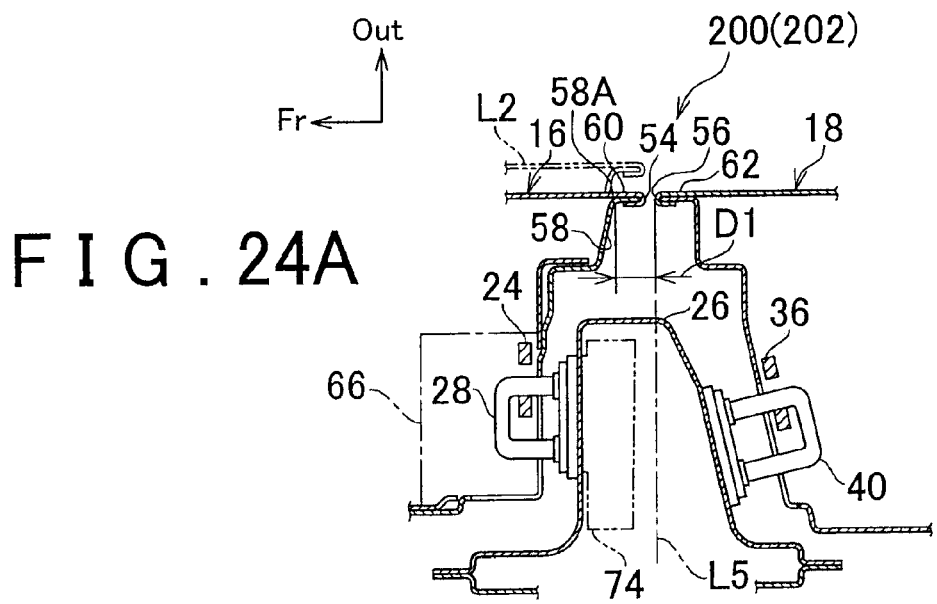
FIGS. 24A to 24C are important-part enlarged plan views in section of the vehicle in which the vehicle door system according to the fourth embodiment of the present invention is used.
Figure 24B:
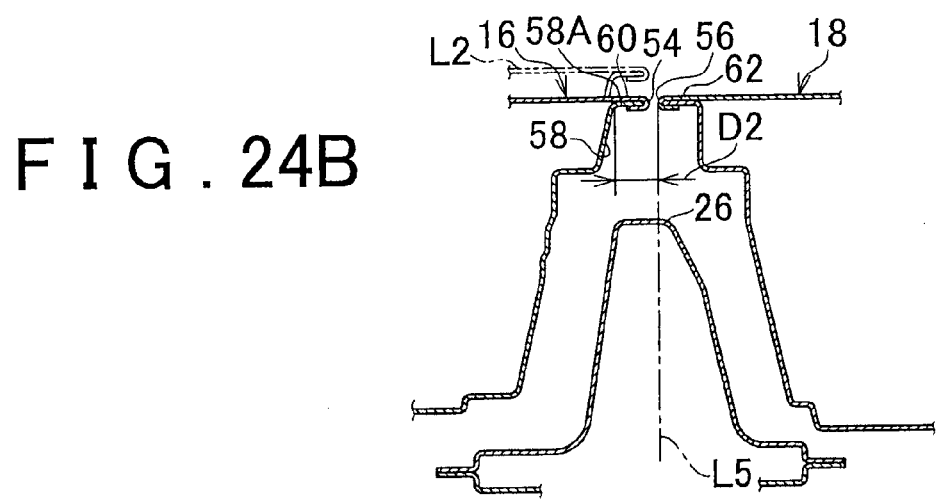
Figure 24C:
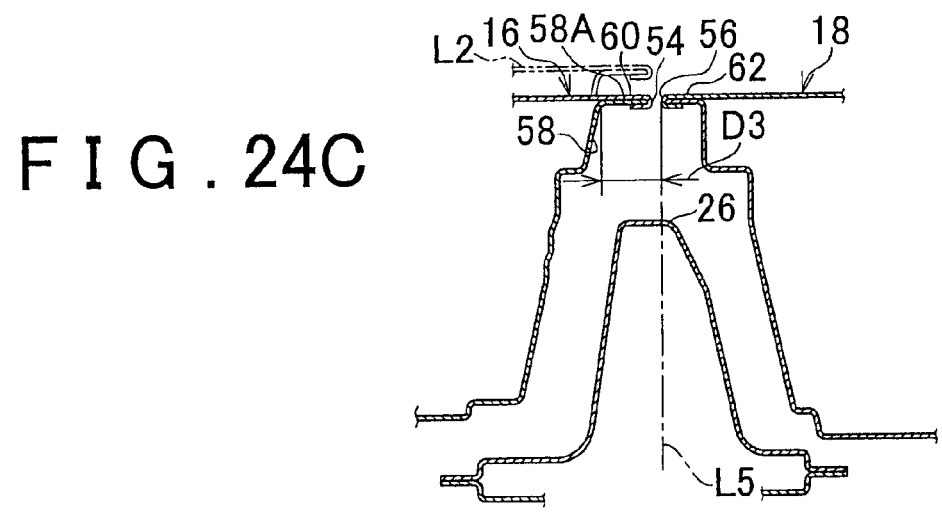

FIGS. 23 to 25 are drawings illustrating the fourth embodiment of the present invention. FIG. 23 is a plan view of a left side portion of a vehicle 202 in which a vehicle door system 200 is used. FIGS. 24A to 24C are important-part enlarged plan views in section of the vehicle 202. FIGS. 25A to 25C are important-part enlarged plan views in section of the vehicle 202, in a case where a forward collision has occurred. In these figures, the arrows Up, Fr and Out indicate the upward direction in the vertical direction of the vehicle, the forward direction in the longitudinal direction of the vehicle, and the outward direction in the width direction of the vehicle, respectively.

First, a configuration of the vehicle 202 in which the vehicle door system 200 according to the fourth embodiment of the present invention will be described.

The vehicle door system 200 according to the fourth embodiment of the present invention is one that is obtained by changing the vehicle door system 10 according to the first embodiment of the present invention described above in the following points. It should be noted that, because the components other than those described below are similar to those of the first embodiment of the present invention described above, the same reference numerals as those of the above-described first embodiment are used for the similar components, and the detailed description thereof will be omitted.

As shown in FIG. 23, in the vehicle 202 in which the vehicle door system 200 according to the fourth embodiment of the present invention is used, a front door 16 is connected to a vehicle body through a pair of upper and lower door hinges 22 on the front end side of the front door 16, and is configured as a hinged swing door that pivots relative to a vehicle body side portion 14.

The front door 16 includes a door lock 66 in the vertically middle portion on the rear end side of the front door 16. The front door 16 is designed so that a latch member of the door lock 66 is engaged with a striker member provided on the vehicle body, whereby the front door 16 is fixedly held on the vehicle body side portion 14 in a door-closed state.

On the other hand, a link arm 32, one end of which is freely pivotally connected to the vehicle body, is freely pivotally connected to the rear door 18 at each of upper and lower portions of the rear door 18 on the other end side of the rear door 18. The rear door 18 is configured as a link-arm type slide door that slides with the link arms 32 swinging, the link arms 32 being individually provided at the upper and lower portions of the rear door 18.

The rear door 18 includes door locks 68 and 70, each having a latch member, in the vertically middle portions of the rear door 18 on the front and rear sides thereof. The rear door 18 is designed so that the latch members of the door locks 68 and 70 are individually engaged with the striker members provided on the vehicle body, whereby the rear door 18 is fixedly held on the vehicle body side portion 14 in a door-closed state.

As shown in FIGS. 24A to 24C, when the front door 16 and the rear door 18 are closed, terminal edge portions 54 and 56, which are provided on respective sides, are positioned so as to face each other in the longitudinal direction of the vehicle.

Formed in the front door 16 is a vehicle width direction surface 58 that extends in the vehicle width direction on the inner side of the terminal edge portion 54 with respect to the vehicle width direction. More specifically, the vehicle width direction surface 58 is formed inclined so that, from the inner side, the more outward the position on the vehicle width direction surface 58 is in the vehicle width direction, the closer the vehicle width direction surface 58 becomes to the terminal edge portion 56 at the front end of the rear door 18. The vehicle width direction surface 58 extends in the vertical direction of the vehicle along the terminal edge portion 54.

In addition, the vehicle width direction surface 58 is formed so that the distance between the vehicle width direction surface 58 and the vehicle-width-direction imaginary line L5 that passes through the terminal edge portion 56 at the front end of the rear door 18 and extends in the vehicle width direction, becomes greater as the position thereon becomes distant from the imaginary line L6 (see FIG. 23), which connects the above-described door locks 66 and 68, in the vertical direction of the vehicle.

FIG. 24A shows a section taken along the line A-A that is positioned on the imaginary line L6 (in the middle portion of the door in the vertical direction) that connects the door locks 66 and 68 in FIG. 23. FIG. 24B shows a section taken along the line B-B (the line D-D) that is positioned vertically away from the imaginary line L6 that connects the door locks 66 and 68 in FIG. 23. FIG. 24C shows a section taken along the line C-C (the line E-E) that is positioned further away from the imaginary line L6 vertically as compared to the line B-B in FIG. 23.

Assuming that, in the sectional views of FIGS. 24A, 24B and 24C, the respective distances between a rising point 58A of the vehicle width direction surface 58 (the connection portion between a rear-end hemmed portion 60 and the vehicle width direction surface 58) and the vehicle-width-direction imaginary line L5 that passes through the terminal edge portion 56 at the front end of the rear door 18 and extends in the vehicle width direction, are distances D1, D2 and D3, respectively, the distances D1, D2 and D3 are set so that D1>D2>D3.

Next, the operations and effects of the vehicle door system 200 according to the fourth embodiment of the present invention will be described.

In the vehicle door system 200 according to the fourth embodiment of the present invention, when a forward collision is predicted in the vehicle 202, the striker member 28 for the front door 16 is moved outwardly in the vehicle width direction by a striker driving motor 74, which causes the portion of the front door 16 at the rear end thereof on the terminal edge portion 54-side to be pushed and displaced outwardly in the vehicle width direction as shown by the chain double-dashed line L2 in FIGS. 24A to 24C. Then, the vehicle width direction surface 58 formed in the front door 16 more inwardly in the vehicle width direction than the terminal edge portion 54 at the rear end of the front door 16 is positioned so as to face the terminal edge portion 56 at the front end of the rear door 18 in the longitudinal direction of the vehicle.

When a forward collision of the vehicle 202 occurs, the force generated by the forward collision is applied to the front door 16. As a result, the front door 16 moves toward the rear of the vehicle while the movement of the front door 16 toward the rear of the vehicle is restricted because the door lock 66 bottoms on a center pillar 26. As shown in FIGS. 25A to 25C, the vehicle width direction surface 58 of the front door 16 is brought into contact with (strikes) the terminal edge portion 56 of the rear door 18.

When a forward collision of the vehicle 202 occurs, the force due to the collision (impact energy) F is divided mainly into F1, F2, and F3 and transmitted to three portions: a roof portion 204; a rocker portion 206 (lower edge portion of the door opening); and a beltline portion 206. The front and rear doors 16 and 18 are held on the vehicle body side portion 14 by the door locks 66 and 68 on the terminal edge portion (54 and 56) sides in the vertically middle portion. Accordingly, the terminal edge portion 54 at the rear end of the front door 16 is deformed as shown by the chain double-dashed line L7 in FIG. 23.

In the front door 16, the amount of displacement toward the rear of the vehicle is larger at upper and lower portions as compared to that of the portion held by the door lock 66 on the vehicle body side portion 14. This is because the movement of the vertically middle portion of the front door 16 toward the rear of the vehicle is restricted because the door lock 66 bottoms on the center pillar 26 as shown in FIG. 24A, and on the other hand, the movement of portions on the upper and lower sides of the door lock 66 toward the rear of the vehicle is not restricted by the vehicle body.

However, in the vehicle door system 200 according to the fourth embodiment of the present invention, the vehicle width direction surface 58 formed in the front door 16 is formed so that the distance between the vehicle width direction surface 58 and the vehicle-width-direction imaginary line L5 that passes through the terminal edge portion 56 at the front end of the rear door 18 and extends in the vehicle width direction, becomes greater as the position thereon becomes distant from the imaginary line L6, which connects the above-described door locks 66 and 68, in the vertical direction of the vehicle.

Accordingly, even when, in the front door 16, the amount of displacement toward the rear of the vehicle is larger at upper and lower portions as compared to that of the portion held by the door lock 66 on the vehicle body side portion 14 as described above, the time at which the vehicle width direction surface 58 of the front door 16 is brought into contact with the terminal edge portion 56 of the rear door 18 is substantially the same over the vertical extension as shown in FIGS. 25A to 25C.

In addition, in the vehicle door system 200 according to the fourth embodiment of the present invention, the above-described vehicle width direction surface 58 formed in the front door 16 is formed inclined so that, from the inner side, the more outward the position on the vehicle width direction surface 58 is in the vehicle width direction, the nearer the terminal edge portion 56 at the front end of the rear door 18 becomes. Accordingly, as described above, when the vehicle width direction surface 58 of the front door 16 is brought into contact with (strikes) the terminal edge portion 56 of the rear door 18 following a forward collision, for example, a component force is applied to the portion of the front door 16 on the terminal edge portion 54-side outwardly in the vehicle width direction because the vehicle width direction surface 58 slides on the terminal edge portion 56 of the rear door 18. Thus, the portion of the front door 16 on the terminal edge portion 54-side is further pushed and displaced outwardly in the vehicle width direction. In addition, at this time, a force is applied to the terminal edge portion 56 of the rear door 18 so that it is pushed and displaced inwardly in the vehicle width direction.

Moreover, the rear door 18 is held by the pair of the front and rear door locks 68 and 70, the straight line connecting the door locks 68 and 70 is positioned in the vertically middle portion, and the upper and lower portions relative to the vertically middle portion are merely maintained in their positions by the reaction force exerted by the weather strip (not shown). Accordingly, while the movement of the portion of the rear door 18 on the straight line connecting the door locks 68 and 70 is restricted by the door locks 68 and 70, the upper and lower portions relative to this portion are deformed toward the direction in which the force is applied, that is, deformed inwardly in the vehicle width direction. Thus, it is possible to secure a greater separation distance between the terminal edge portion 54 at the rear end of the front door 16 and the terminal edge portion 56 at the front end of the rear door 18 in the vehicle width direction.

As described above in detail, with the vehicle door system 200 according to the fourth embodiment of the present invention, when the forward collision prediction sensor 76 predicts a forward collision of the vehicle 202, the state of the pair of the front and rear doors 16 and 18 is immediately changed to the state (second state) where the terminal edge portion 54 at the rear end of the front door 16 is positioned more outwardly in the vehicle width direction than the terminal edge portion 56 at the front end of the rear door 18. Thus, even when the front door 16 moves toward the rear door 18 side (that is, toward the rear of the vehicle) due to the forward collision or the like that has occurred after the forward collision is predicted, it is possible to prevent the situation in which the front door 16 is jammed inside the rear door 18, more specifically, the situation in which the rear-end hemmed portion 60 of the front door 16 gets inside the front-end hemmed portion 62 of the rear door 18 with respect to the vehicle width direction. In this way, it is possible to ensure the opening operation of the front door 16 with no interference from the rear door 18.

In particular, according to the vehicle door system 200 according to the fourth embodiment of the present invention, even when, in the front door 16, the amount of displacement toward the rear of the vehicle is larger at upper and lower portions as compared to that of the portion held by the door lock 66 on the vehicle body side portion 14 as described above, it is possible to make the time, at which the vehicle width direction surface 58 of the front door 16 is brought into contact with the terminal edge portion 56 of the rear door 18, substantially the same over the vertical extension as shown in FIGS. 25A to 25C. Thus, it is possible to suppress concentration of the load of the terminal edge portion 56 of the rear door 18 on the vehicle width direction surface 58 of the front door 16, and it is possible to prevent the front door 16 from being jammed inside the rear door 18.

In addition, in the vehicle door system 200 according to the fourth embodiment of the present invention, when the vehicle width direction surface 58 of the front door 16 is brought into contact with (strikes) the terminal edge portion 56 of the rear door 18 following a forward collision or the like, for example, a component force is applied to the portion of the front door 16 on the terminal edge portion 54-side outwardly in the vehicle width direction because the vehicle width direction surface 58 slides on the terminal edge portion 56 of the rear door 18. Thus, it is possible to push and displace the portion of the front door 16 on the terminal edge portion 54-side outwardly in the vehicle width direction.

In addition, in this case, the upper and lower portions relative to the border that is the straight line connecting the door locks 68 and 70 of the rear door 18 are deformed inwardly with respect to the vehicle, so that it is possible to secure a greater separation distance between the terminal edge portion 54 at the rear end of the front door 16 and the terminal edge portion 56 at the front end of the rear door 18 in the vehicle width direction. Thus, it is possible to prevent the front door 16 from being jammed inside the rear door 18.

In addition, according to the vehicle door system 200 according to the fourth embodiment of the present invention, the rear door 18 is configured as a link-arm type slide door that slides with the link arm 32 swinging. The sliding movement trajectory La of the terminal edge portion of the link-arm type slide door lies along the vehicle width direction near the position at which the door is completely closed.

Accordingly, as described above, when the vehicle width direction surface 58 of the front door 16 is brought into contact with (strikes) the terminal edge portion 56 of the rear door 18 following a forward collision or the like, and a component force is therefore applied to the portion of the front door 16 on the terminal edge portion 54-side outwardly in the vehicle width direction, it is possible to push and displace the portion of the rear door 18 on the terminal edge portion 56-side inwardly in the vehicle width direction owing to the door trajectory characteristic of the link-arm type slide door.

Next, a modification of the vehicle door system 200 according to the fourth embodiment of the present invention will be described.

In the above embodiment, the rear door 18 is configured as a link-arm type slide door that slides with the link arm 32 swinging. However, the rear door 18 may be configured as a hinged swing door that is connected to a rear pillar 44 through a door hinge 134 on the rear end side of the door, and that pivots relative to the vehicle body side portion 14 (see FIG. 13).

In the above embodiment, the front door 16 is configured as a hinged swing door that pivots relative to the vehicle body side portion 14. However, the front door 16 may be configured as a link-arm type slide door in which a link arm 138, one end of which is freely pivotally connected to the vehicle body side portion 14 through a hinge base 136, is freely pivotally connected to the front door 16 with a door hinge 140 on the other end side, and the link-arm type slide door slides with the link arm 138 swinging (see FIG. 14).

When, as described above, the rear door 18 is configured as a link-arm type slide door, or is configured as a hinged swing door whose open end is on the front end side (see FIG. 13), a configuration may be adopted in which the portion of the rear door 18 on the terminal edge portion 56-side is retracted inwardly in the vehicle width direction by moving a striker member 40 inwardly in the vehicle width direction using a striker driving motor 124, or by rotating a latch member 36 using the closer motor 69, for example.

As described above, when the vehicle width direction surface 58 of the front door 16 is brought into contact with (strikes) the terminal edge portion 56 of the rear door 18 following a forward collision or the like, a component force is applied to the portion of the rear door 18 on the terminal edge portion 56-side inwardly in the vehicle width direction. A configuration may be adopted in which, at this time, the rear door 18 configured as a link-arm type slide door is pushed and displaced inwardly in the vehicle width direction.

While the invention has been described with reference to what are considered to be preferred embodiments thereof, it is to be understood that the invention is not limited to the disclosed embodiments or constructions. On the contrary, the invention is intended to cover various modifications and equivalent arrangements. In addition, while the various elements of the disclosed invention are shown in various combinations and configurations, which are exemplary, other combinations and configurations, including more, less or only a single element, are also within the scope of the invention.

The invention claimed is:

1. A vehicle door system comprising:
a pair of first and second doors that are arranged along a longitudinal direction of a vehicle on a side portion of a vehicle body, and that have first and second terminal edge portions, respectively, extending in a vertical direction of the vehicle, wherein states of the pair of the first and second doors include a first state where the pair of the first and second terminal edge portions face each other in the longitudinal direction of the vehicle, and a second state where the first terminal edge portion out of the pair of the first and second terminal edge portions is positioned more outwardly in the vehicle width direction than the second terminal edge portion;
a drive unit for changing the state of the pair of the first and second doors from the first state to the second state;
a collision detection device for outputting a collision signal in response to at least one of prediction and detection of a collision of the vehicle; and
a controller for controlling the drive unit so that the state of the pair of the first and second doors is changed from the first state to the second state in response to detection of the collision signal, wherein:
the collision detection device outputs a collision prediction signal in response to the prediction of a collision of the vehicle, and outputs a collision detection signal in response to the detection of a collision of the vehicle; and
the controller controls the drive unit so that the state of the pair of the first and second doors is changed from the first state to the second state in response to detection of the collision prediction signal, and so that, when a predetermined time has passed since the collision prediction signal is detected, and no collision detection signal is detected, the state of the pair of the first and second doors is changed from the second state to the first state.

2. The vehicle door system according to claim 1, wherein the second door in which the second terminal edge portion is provided is configured as a slide door in which a link arm, one end of which is freely pivotally connected to the vehicle body side portion, is freely pivotally connected to the slide door on the other end side, and that slides with the link arm swinging.

3. The vehicle door system according to claim 1, wherein the first door provided with the first terminal edge portion pivots on the front pillar side, and opens on the center pillar side.

4. The vehicle door system according to claim 1, wherein the first door provided with the first terminal edge portion is a front door, and the second door provided with the second terminal edge portion is a rear door.

5. The vehicle door system according to claim 1, wherein:
each of the pair of the first and second doors includes a member that fixedly holds the corresponding door on the vehicle body side portion on the terminal edge portion side in a middle portion in the vertical direction of the vehicle;
the first door out of the pair of the first and second doors has a vehicle width direction surface that is formed along the first terminal edge portion more inwardly in the vehicle width direction than the first terminal edge portion, and that extends in the vehicle width direction; and
the vehicle width direction surface is formed so that the more distant a position on the vehicle width direction surface is from the door fixedly-holding member in the vertical direction of the vehicle, the longer a distance along the longitudinal direction of the vehicle between the vehicle width direction surface and the second terminal edge portion out of the pair of the first and second terminal edge portions becomes.

6. The vehicle door system according to claim 5, wherein the vehicle width direction surface is formed inclined so that, from the inner side, the more outward a position on the vehicle width direction surface is in the vehicle width direction, the closer the vehicle width direction surface becomes to the second terminal edge portion.

7. The vehicle door system according to claim 1, wherein the drive unit includes:
a holding portion that is capable of moving at least one door out of the pair of the first and second doors in the vehicle width direction while holding the one door at a portion thereof on the terminal edge portion side on the vehicle body side portion; and
a drive portion that moves the holding portion in the vehicle width direction.

8. The vehicle door system according to claim 7, wherein the holding portion includes a striker provided on a center pillar, and
the drive portion includes a motor provided in the center pillar.

9. The vehicle door system according to claim 7, wherein the holding portion includes: a first striker, provided on a center pillar, for holding the first door; and a second striker, provided on the center pillar, for holding the second door, and
the drive portion includes: a first motor, provided in the center pillar, for moving the first striker; and a second motor, provided in the center pillar, for moving the second striker.

10. The vehicle door system according to claim 7, wherein the first door out of the pair of the first and second doors is held on the vehicle body side portion by the holding portion, and an urging unit disposed between the first door and the vehicle body side portion urges a portion of the first door on the terminal edge portion side outwardly in the vehicle width direction.

11. The vehicle door system according to claim 10, wherein
the urging unit includes a weather strip.

12. A method of controlling a vehicle door system that includes a pair of first and second doors that are arranged along a longitudinal direction of a vehicle on a side portion of a vehicle body, and that have first and second terminal edge portions, respectively, extending in a vertical direction of the vehicle, the method comprising:

determining whether a collision of the vehicle will occur, or whether a collision of the vehicle has occurred;

when it is determined that a collision of the vehicle will occur, changing the state of the pair of the first and second doors from a first state where the pair of the first and second terminal edge portions face each other in the longitudinal direction of the vehicle to a second state where the first terminal edge portion out of the pair of the first and second terminal edge portions is positioned more outwardly in the vehicle width direction than the second terminal edge portion; and, when a predetermined time has passed since it was determined that a collision of the vehicle will occur, and it has not been determined that a collision of the vehicle has occurred, changing the state of the pair of the first and second doors from the second state to the first state.

* * * * *